(12) United States Patent
Noyes

(10) Patent No.: US 10,500,582 B2
(45) Date of Patent: *Dec. 10, 2019

(54) COMPOSITIONS OF MATTER INCLUDING SOLID CARBON FORMED BY REDUCING CARBON OXIDES

(71) Applicant: Seerstone LLC, Provo, UT (US)

(72) Inventor: Dallas B. Noyes, Provo, UT (US)

(73) Assignee: Seerstone LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,955

(22) Filed: Nov. 21, 2016

(65) Prior Publication Data

US 2017/0073232 A1    Mar. 16, 2017

Related U.S. Application Data

(60) Continuation of application No. 14/163,179, filed on Jan. 24, 2014, now Pat. No. 9,556,031, which is a
(Continued)

(51) Int. Cl.
*B01J 35/06* (2006.01)
*B82Y 30/00* (2011.01)
(Continued)

(52) U.S. Cl.
CPC ............. *B01J 35/06* (2013.01); *B01J 23/745* (2013.01); *B01J 35/026* (2013.01); *B82Y 30/00* (2013.01);
(Continued)

(58) Field of Classification Search
None
See application file for complete search history.

(56) References Cited

U.S. PATENT DOCUMENTS 1,478,730 A    12/1923  Brownlee
1,735,925 A    11/1929  Jaeger
(Continued)

FOREIGN PATENT DOCUMENTS

EP    2186931 A1    5/2010
EP    2404869 A1    1/2012
(Continued)

OTHER PUBLICATIONS

Hall et al.; Carbon Nanotube Synthesis Upon Stainless Steel and Meshes; Carbon; 41, 659-672; 2003.*
(Continued)

*Primary Examiner* — Guinever S Gregorio
(74) *Attorney, Agent, or Firm* — TraskBritt

(57) ABSTRACT

A method for production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions, and optional additives used in the reduction reaction. The resulting solid carbon products have many commercial applications.

18 Claims, 14 Drawing Sheets

Related U.S. Application Data division of application No. 13/263,311, filed as application No. PCT/US2010/029934 on Apr. 5, 2010, now Pat. No. 8,679,444.

(60) Provisional application No. 61/170,199, filed on Apr. 17, 2009.

(51) Int. Cl.

| | | |
|---|---|---|
| *B82Y 40/00* | (2011.01) | |
| *D01F 9/127* | (2006.01) | |
| *B01J 23/745* | (2006.01) | |
| *B01J 35/02* | (2006.01) | |
| *C09C 1/48* | (2006.01) | |
| *C01B 32/05* | (2017.01) | |
| *C01B 32/152* | (2017.01) | |
| *C01B 32/158* | (2017.01) | |
| *C01B 32/162* | (2017.01) | |
| *C01B 32/20* | (2017.01) | |
| *C01B 32/184* | (2017.01) | |

(52) U.S. Cl.
CPC .............. *B82Y 40/00* (2013.01); *C01B 32/05* (2017.08); *C01B 32/152* (2017.08); *C01B 32/158* (2017.08); *C01B 32/162* (2017.08); *C01B 32/184* (2017.08); *C01B 32/20* (2017.08); *C09C 1/48* (2013.01); *D01F 9/127* (2013.01); *C01P 2004/02* (2013.01); *Y02E 60/366* (2013.01); *Y10T 428/2982* (2015.01)

(56) References Cited

U.S. PATENT DOCUMENTS

| | | | |
|---|---|---|---|
| 1,964,744 | A | 7/1934 | Odell |
| 2,440,424 | A | 4/1948 | Wiegand et al. |
| 2,731,328 | A | 1/1956 | Atkinson |
| 2,745,973 | A | 5/1956 | Rappaport |
| 2,796,327 | A | 6/1957 | Pollock |
| 2,796,331 | A | 6/1957 | Kauffman et al. |
| 2,800,616 | A | 7/1957 | Becker |
| 2,811,653 | A | 10/1957 | Moore |
| 2,819,414 | A | 1/1958 | Sherwood et al. |
| 2,837,666 | A | 6/1958 | Linder |
| 2,976,433 | A | 3/1961 | Rappaport et al. |
| 3,094,634 | A | 6/1963 | Rappaport |
| 3,172,774 | A | 3/1965 | Diefendorf |
| 3,249,830 | A | 5/1966 | Adany |
| 3,378,345 | A | 4/1968 | Bourdeau et al. |
| 3,634,999 | A | 1/1972 | Howard et al. |
| 3,714,474 | A | 1/1973 | Hoff |
| 3,771,959 | A | 11/1973 | Fletcher et al. |
| 4,024,420 | A | 5/1977 | Anthony et al. |
| 4,126,000 | A | 11/1978 | Funk |
| 4,197,281 | A | 4/1980 | Muenger |
| 4,602,477 | A | 7/1986 | Lucadamo |
| 4,628,143 | A | 12/1986 | Brotz |
| 4,663,230 | A | 5/1987 | Tennent |
| 4,710,483 | A | 12/1987 | Burk et al. |
| 4,725,346 | A | 2/1988 | Joshi |
| 4,727,207 | A | 2/1988 | Paparizos et al. |
| 4,746,458 | A | 5/1988 | Brotz |
| 4,900,368 | A | 2/1990 | Brotz |
| 5,008,579 | A | 4/1991 | Conley et al. |
| 5,021,139 | A | 6/1991 | Hartig et al. |
| 5,082,505 | A | 1/1992 | Cota et al. |
| 5,122,332 | A | 6/1992 | Russell |
| 5,149,584 | A | 9/1992 | Baker et al. |
| 5,187,030 | A | 2/1993 | Firmin et al. |
| 5,260,621 | A | 11/1993 | Little et al. |
| 5,396,141 | A | 3/1995 | Jantz et al. |
| 5,413,866 | A | 5/1995 | Baker et al. |
| 5,456,897 | A | 10/1995 | Moy et al. |
| 5,531,424 | A | 7/1996 | Whipp |
| 5,569,635 | A | 10/1996 | Moy et al. |
| 5,578,543 | A | 11/1996 | Tennent et al. |
| 5,589,152 | A | 12/1996 | Tennent et al. |
| 5,641,466 | A | 6/1997 | Ebbesen et al. |
| 5,648,056 | A | 7/1997 | Tanaka |
| 5,650,370 | A | 7/1997 | Tennent et al. |
| 5,691,054 | A | 11/1997 | Tennent et al. |
| 5,707,916 | A | 1/1998 | Snyder et al. |
| 5,726,116 | A | 3/1998 | Moy et al. |
| 5,747,161 | A | 5/1998 | Iijima |
| 5,780,101 | A | 7/1998 | Nolan et al. |
| 5,859,484 | A | 1/1999 | Mannik et al. |
| 5,877,110 | A | 3/1999 | Snyder et al. |
| 5,965,267 | A | 10/1999 | Nolan et al. |
| 5,997,832 | A | 12/1999 | Lieber et al. |
| 6,099,965 | A | 8/2000 | Tennent et al. |
| 6,159,892 | A | 12/2000 | Moy et al. |
| 6,183,714 | B1 | 2/2001 | Smalley et al. |
| 6,203,814 | B1 | 3/2001 | Fisher et al. |
| 6,221,330 | B1 | 4/2001 | Moy et al. |
| 6,232,706 | B1 | 5/2001 | Dai et al. |
| 6,239,057 | B1 | 5/2001 | Ichikawa et al. |
| 6,261,532 | B1 | 7/2001 | Ono |
| 6,262,129 | B1 | 7/2001 | Murray et al. |
| 6,294,144 | B1 | 9/2001 | Moy et al. |
| 6,333,016 | B1 | 12/2001 | Resasco et al. |
| 6,346,189 | B1 | 2/2002 | Dai et al. |
| 6,361,861 | B2 | 3/2002 | Gao |
| 6,375,917 | B1 | 4/2002 | Mandeville et al. |
| 6,413,487 | B1 | 7/2002 | Resasco et al. |
| 6,423,288 | B2 | 7/2002 | Mandeville et al. |
| 6,426,442 | B1 | 7/2002 | Ichikawa et al. |
| 6,465,813 | B2 | 10/2002 | Ihm |
| 6,518,218 | B1 | 2/2003 | Sun et al. |
| 6,596,101 | B2 | 7/2003 | Weihs et al. |
| 6,645,455 | B2 | 11/2003 | Margrave et al. |
| 6,683,783 | B1 | 1/2004 | Smalley et al. |
| 6,686,311 | B2 | 2/2004 | Sun et al. |
| 6,692,717 | B1 | 2/2004 | Smalley et al. |
| 6,713,519 | B2 | 3/2004 | Wang et al. |
| 6,749,827 | B2 | 6/2004 | Smalley et al. |
| 6,761,870 | B1 | 7/2004 | Smalley et al. |
| 6,790,425 | B1 | 9/2004 | Smalley et al. |
| 6,800,369 | B2 | 10/2004 | Gimzewski et al. |
| 6,827,918 | B2 | 12/2004 | Margrave et al. |
| 6,827,919 | B1 | 12/2004 | Moy et al. |
| 6,835,330 | B2 | 12/2004 | Nishino et al. |
| 6,835,366 | B1 | 12/2004 | Margrave et al. |
| 6,841,139 | B2 | 1/2005 | Margrave et al. |
| 6,855,301 | B1 | 2/2005 | Rich et al. |
| 6,855,593 | B2 | 2/2005 | Andoh |
| 6,875,412 | B2 | 4/2005 | Margrave et al. |
| 6,890,986 | B2 | 5/2005 | Pruett |
| 6,899,945 | B2 | 5/2005 | Smalley et al. |
| 6,905,544 | B2 | 6/2005 | Setoguchi et al. |
| 6,913,740 | B2 | 7/2005 | Polverejan et al. |
| 6,913,789 | B2 | 7/2005 | Smalley et al. |
| 6,916,434 | B2 | 7/2005 | Nishino et al. |
| 6,919,064 | B2 | 7/2005 | Resasco et al. |
| 6,936,233 | B2 | 8/2005 | Smalley et al. |
| 6,949,237 | B2 | 9/2005 | Smalley et al. |
| 6,955,800 | B2 | 10/2005 | Resasco et al. |
| 6,960,389 | B2 | 11/2005 | Tennent et al. |
| 6,962,685 | B2 | 11/2005 | Sun |
| 6,979,709 | B2 | 12/2005 | Smalley et al. |
| 6,986,876 | B2 | 1/2006 | Smalley et al. |
| 6,994,907 | B2 | 2/2006 | Resasco et al. |
| 6,998,358 | B2 | 2/2006 | French et al. |
| 7,011,771 | B2 | 3/2006 | Gao et al. |
| 7,041,620 | B2 | 5/2006 | Smalley et al. |
| 7,045,108 | B2 | 5/2006 | Jiang et al. |
| 7,048,999 | B2 | 5/2006 | Smalley et al. |
| 7,052,668 | B2 | 5/2006 | Smalley et al. |
| 7,067,098 | B2 | 6/2006 | Colbert et al. |
| 7,071,406 | B2 | 7/2006 | Smalley et al. |
| 7,074,379 | B2 | 7/2006 | May et al. |
| 7,094,385 | B2 | 8/2006 | Beguin et al. |
| 7,094,386 | B2 | 8/2006 | Resasco et al. |
| 7,094,679 | B1 | 8/2006 | Li et al. |

(56) References Cited

U.S. PATENT DOCUMENTS

| | | | |
|---|---|---|---|
| 7,097,820 | B2 | 8/2006 | Colbert et al. |
| 7,105,596 | B2 | 9/2006 | Smalley et al. |
| 7,125,534 | B1 | 10/2006 | Smalley et al. |
| 7,132,062 | B1 | 11/2006 | Howard |
| 7,135,159 | B2 | 11/2006 | Shaffer et al. |
| 7,135,160 | B2 | 11/2006 | Yang et al. |
| 7,138,100 | B2 | 11/2006 | Smalley et al. |
| 7,150,864 | B1 | 12/2006 | Smalley et al. |
| 7,157,068 | B2 | 1/2007 | Li et al. |
| 7,160,532 | B2 | 1/2007 | Liu et al. |
| 7,169,329 | B2 | 1/2007 | Wong et al. |
| 7,201,887 | B2 | 4/2007 | Smalley et al. |
| 7,204,970 | B2 | 4/2007 | Smalley et al. |
| 7,205,069 | B2 | 4/2007 | Smalley et al. |
| 7,212,147 | B2 | 5/2007 | Messano |
| 7,214,360 | B2 | 5/2007 | Chen et al. |
| 7,250,148 | B2 | 7/2007 | Yang et al. |
| 7,270,795 | B2 | 9/2007 | Kawakami et al. |
| 7,291,318 | B2 | 11/2007 | Sakurabayashi et al. |
| 7,338,648 | B2 | 3/2008 | Harutyunyan et al. |
| 7,365,289 | B2 | 4/2008 | Wilkes et al. |
| 7,374,793 | B2 | 5/2008 | Furukawa et al. |
| 7,390,477 | B2 | 6/2008 | Smalley et al. |
| 7,396,798 | B2 | 7/2008 | Ma et al. |
| 7,408,186 | B2 | 8/2008 | Merkulov et al. |
| 7,410,628 | B2 | 8/2008 | Bening et al. |
| 7,413,723 | B2 | 8/2008 | Niu et al. |
| 7,452,828 | B2 | 11/2008 | Hirakata et al. |
| 7,459,137 | B2 | 12/2008 | Tour et al. |
| 7,459,138 | B2 | 12/2008 | Resasco et al. |
| 7,473,873 | B2 | 1/2009 | Biris et al. |
| 7,510,695 | B2 | 3/2009 | Smalley et al. |
| 7,527,780 | B2 | 5/2009 | Margrave et al. |
| 7,563,427 | B2 | 7/2009 | Wei et al. |
| 7,563,428 | B2 | 7/2009 | Resasco et al. |
| 7,569,203 | B2 | 8/2009 | Fridman et al. |
| 7,572,426 | B2 | 8/2009 | Strano et al. |
| 7,585,482 | B2 | 9/2009 | Resasco et al. |
| 7,585,483 | B2 | 9/2009 | Edwin et al. |
| 7,601,322 | B2 | 10/2009 | Huang |
| 7,611,579 | B2 | 11/2009 | Lashmore et al. |
| 7,615,204 | B2 | 11/2009 | Ajayan et al. |
| 7,618,599 | B2 | 11/2009 | Kim et al. |
| 7,622,059 | B2 | 11/2009 | Bordere et al. |
| 7,632,569 | B2 | 12/2009 | Smalley et al. |
| 7,645,933 | B2 | 1/2010 | Narkis et al. |
| 7,655,302 | B2 | 2/2010 | Smalley et al. |
| 7,670,510 | B2 | 3/2010 | Wong et al. |
| 7,700,065 | B2 | 4/2010 | Fujioka et al. |
| 7,704,481 | B2 | 4/2010 | Higashi et al. |
| 7,718,283 | B2 | 5/2010 | Raffaelle et al. |
| 7,719,265 | B2 | 5/2010 | Harutyunyan et al. |
| 7,731,930 | B2 | 6/2010 | Taki et al. |
| 7,736,741 | B2 | 6/2010 | Maruyama et al. |
| 7,740,825 | B2 | 6/2010 | Tohji et al. |
| 7,749,477 | B2 | 7/2010 | Jiang et al. |
| 7,754,182 | B2 | 7/2010 | Jiang et al. |
| 7,772,447 | B2 | 8/2010 | Iaccino et al. |
| 7,780,939 | B2 | 8/2010 | Margrave et al. |
| 7,785,558 | B2 | 8/2010 | Hikata |
| 7,790,228 | B2 | 9/2010 | Suekane et al. |
| 7,794,690 | B2 | 9/2010 | Abatzoglou et al. |
| 7,794,797 | B2 | 9/2010 | Vasenkov |
| 7,799,246 | B2 | 9/2010 | Bordere et al. |
| 7,811,542 | B1 | 10/2010 | McElrath et al. |
| 7,824,648 | B2 | 11/2010 | Jiang et al. |
| 7,837,968 | B2 | 11/2010 | Chang et al. |
| 7,838,843 | B2 | 11/2010 | Kawakami et al. |
| 7,842,271 | B2 | 11/2010 | Petrik |
| 7,854,945 | B2 | 12/2010 | Fischer et al. |
| 7,854,991 | B2 | 12/2010 | Hata et al. |
| 7,858,648 | B2 | 12/2010 | Bianco et al. |
| 7,871,591 | B2 | 1/2011 | Harutyunyan et al. |
| 7,883,995 | B2 | 2/2011 | Mitchell et al. |
| 7,887,774 | B2 | 2/2011 | Strano et al. |
| 7,888,543 | B2 | 2/2011 | Iaccino et al. |
| 7,897,209 | B2 | 3/2011 | Shibuya et al. |
| 7,901,654 | B2 | 3/2011 | Harutyunyan |
| 7,906,095 | B2 | 3/2011 | Kawabata |
| 7,919,065 | B2 | 4/2011 | Pedersen et al. |
| 7,923,403 | B2 | 4/2011 | Ma et al. |
| 7,923,615 | B2 | 4/2011 | Silvy et al. |
| 7,932,419 | B2 | 4/2011 | Liu et al. |
| 7,947,245 | B2 | 5/2011 | Tada et al. |
| 7,951,351 | B2 | 5/2011 | Ma et al. |
| 7,964,174 | B2 | 6/2011 | Dubin et al. |
| 7,981,396 | B2 | 7/2011 | Harutyunyan |
| 7,988,861 | B2 | 8/2011 | Pham-Huu et al. |
| 7,993,594 | B2 | 8/2011 | Wei et al. |
| 8,012,447 | B2 | 9/2011 | Harutyunyan et al. |
| 8,017,282 | B2 | 9/2011 | Choi et al. |
| 8,017,892 | B2 | 9/2011 | Biris et al. |
| 8,038,908 | B2 | 10/2011 | Hirai et al. |
| 8,114,518 | B2 | 2/2012 | Hata et al. |
| 8,138,384 | B2 | 3/2012 | Iaccino et al. |
| 8,173,096 | B2 | 5/2012 | Chang et al. |
| 8,178,049 | B2 | 5/2012 | Shiraki et al. |
| 8,226,902 | B2 | 7/2012 | Jang et al. |
| 8,314,044 | B2 | 11/2012 | Jangbarwala |
| 8,679,444 | B2 | 3/2014 | Noyes |
| 9,090,472 | B2 | 7/2015 | Noyes |
| 9,221,685 | B2 | 12/2015 | Noyes |
| 9,475,699 | B2 | 10/2016 | Noyes |
| 2001/0009119 | A1 | 7/2001 | Murray et al. |
| 2002/0054849 | A1 | 5/2002 | Baker et al. |
| 2002/0102193 | A1 | 8/2002 | Smalley et al. |
| 2002/0102196 | A1 | 8/2002 | Smalley et al. |
| 2002/0127169 | A1 | 9/2002 | Smalley et al. |
| 2002/0127170 | A1 | 9/2002 | Hong et al. |
| 2002/0172767 | A1 | 11/2002 | Grigorian et al. |
| 2003/0059364 | A1 | 3/2003 | Prilutskiy |
| 2003/0147802 | A1 | 8/2003 | Smalley et al. |
| 2003/0194362 | A1 | 10/2003 | Rogers et al. |
| 2004/0053440 | A1 | 3/2004 | Lai et al. |
| 2004/0070009 | A1 | 4/2004 | Resasco et al. |
| 2004/0105807 | A1 | 6/2004 | Fan et al. |
| 2004/0111968 | A1 | 6/2004 | Day et al. |
| 2004/0151654 | A1 | 8/2004 | Wei et al. |
| 2004/0194705 | A1 | 10/2004 | Dai et al. |
| 2004/0197260 | A1 | 10/2004 | Resasco et al. |
| 2004/0202603 | A1 | 10/2004 | Fischer et al. |
| 2004/0234445 | A1 | 11/2004 | Serp et al. |
| 2004/0247503 | A1 | 12/2004 | Hyeon |
| 2004/0265212 | A1 | 12/2004 | Varadan et al. |
| 2005/0002850 | A1 | 1/2005 | Niu et al. |
| 2005/0002851 | A1 | 1/2005 | McElrath et al. |
| 2005/0025695 | A1 | 2/2005 | Pradhan |
| 2005/0042162 | A1 | 2/2005 | Resasco et al. |
| 2005/0046322 | A1 | 3/2005 | Kim et al. |
| 2005/0074392 | A1 | 4/2005 | Yang et al. |
| 2005/0079118 | A1 | 4/2005 | Maruyama et al. |
| 2005/0089684 | A1* | 4/2005 | Barron .................. B82Y 10/00 428/408 |
| 2005/0100499 | A1 | 5/2005 | Oya et al. |
| 2005/0176990 | A1 | 8/2005 | Coleman et al. |
| 2005/0244325 | A1 | 11/2005 | Nam et al. |
| 2005/0276743 | A1 | 12/2005 | Lacombe et al. |
| 2006/0013757 | A1 | 1/2006 | Edwin et al. |
| 2006/0032330 | A1 | 2/2006 | Sato |
| 2006/0039849 | A1 | 2/2006 | Resasco et al. |
| 2006/0045837 | A1 | 3/2006 | Nishimura |
| 2006/0078489 | A1 | 4/2006 | Harutyunyan et al. |
| 2006/0104884 | A1 | 5/2006 | Shaffer et al. |
| 2006/0104886 | A1 | 5/2006 | Wilson |
| 2006/0104887 | A1 | 5/2006 | Fujioka et al. |
| 2006/0133990 | A1 | 6/2006 | Hyeon et al. |
| 2006/0141346 | A1 | 6/2006 | Gordon et al. |
| 2006/0165988 | A1 | 7/2006 | Chiang et al. |
| 2006/0191835 | A1 | 8/2006 | Petrik et al. |
| 2006/0199770 | A1 | 9/2006 | Bianco et al. |
| 2006/0204426 | A1 | 9/2006 | Akins et al. |
| 2006/0225534 | A1 | 10/2006 | Swihart et al. |
| 2006/0228286 | A1 | 10/2006 | Tada et al. |
| 2006/0239890 | A1 | 10/2006 | Chang et al. |

(56) References Cited

U.S. PATENT DOCUMENTS

| | | |
|---|---|---|
| 2006/0239891 A1 | 10/2006 | Niu et al. |
| 2006/0245996 A1 | 11/2006 | Xie et al. |
| 2006/0275956 A1 | 12/2006 | Konesky |
| 2007/0003470 A1 | 1/2007 | Smalley et al. |
| 2007/0020168 A1 | 1/2007 | Asmussen et al. |
| 2007/0031320 A1 | 2/2007 | Jiang et al. |
| 2007/0080605 A1 | 4/2007 | Chandrashekhar et al. |
| 2007/0092431 A1 | 4/2007 | Resasco et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0266825 A1 | 11/2007 | Ripley et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0134942 A1 | 6/2008 | Brenner et al. |
| 2008/0160312 A1 | 7/2008 | Furukawa et al. |
| 2008/0169061 A1 | 7/2008 | Tour et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0226538 A1 | 9/2008 | Rumpf et al. |
| 2008/0233402 A1 | 9/2008 | Carlson et al. |
| 2008/0260618 A1 | 10/2008 | Kawabata |
| 2008/0274277 A1 | 11/2008 | Rashidi et al. |
| 2008/0279753 A1 | 11/2008 | Harutyunyan |
| 2008/0280136 A1 | 11/2008 | Lachariah et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaelle et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0035569 A1 | 2/2009 | Gonzalez Moral et al. |
| 2009/0056802 A1 | 3/2009 | Rabani |
| 2009/0074634 A1 | 3/2009 | Tada et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0213419 A1 | 8/2010 | Jiang et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |
| 2010/0239489 A1 | 9/2010 | Harutyunyan et al. |
| 2010/0254860 A1 | 10/2010 | Shiraki et al. |
| 2010/0254886 A1 | 10/2010 | McElrath et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0051775 A1* | 3/2011 | Ivanov .................. B82Y 30/00 374/143 |
| 2011/0053020 A1 | 3/2011 | Norton et al. |
| 2011/0053050 A1 | 3/2011 | Lim et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0150746 A1 | 6/2011 | Khodadadi et al. |
| 2011/0155964 A1 | 6/2011 | Arnold et al. |
| 2011/0158892 A1 | 6/2011 | Yamaki |
| 2011/0171109 A1 | 7/2011 | Petrik |
| 2011/0174145 A1 | 7/2011 | Ogrin et al. |
| 2011/0180385 A1* | 7/2011 | Imholt .................. B01J 19/126 204/157.15 |
| 2011/0206469 A1 | 8/2011 | Furuyama et al. |
| 2011/0262340 A1* | 10/2011 | Krishna .................. B82Y 30/00 423/445 R |
| 2011/0298071 A9 | 12/2011 | Spencer et al. |
| 2012/0034150 A1 | 2/2012 | Noyes |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2012/0152725 A1* | 6/2012 | Barker .................. B82Y 30/00 204/157.44 |
| 2012/0238021 A1* | 9/2012 | Hashim .................. C01B 35/00 435/395 |
| 2013/0154438 A1 | 6/2013 | Tan Xing Haw |
| 2014/0021827 A1 | 1/2014 | Noyes |
| 2014/0127488 A1* | 5/2014 | Zhamu .................. H01B 1/04 428/216 |
| 2014/0141248 A1 | 5/2014 | Noyes |
| 2014/0348739 A1 | 11/2014 | Denton et al. |

(56) References Cited

U.S. PATENT DOCUMENTS

| | | | |
|---|---|---|---|
| 2015/0059527 A1 | 3/2015 | Noyes | |
| 2015/0059571 A1 | 3/2015 | Denton et al. | |
| 2015/0064092 A1 | 3/2015 | Noyes | |
| 2015/0064096 A1 | 3/2015 | Noyes | |
| 2015/0064097 A1 | 3/2015 | Noyes | |
| 2015/0071846 A1 | 3/2015 | Noyes | |
| 2015/0071848 A1 | 3/2015 | Denton et al. | |
| 2015/0078981 A1 | 3/2015 | Noyes | |
| 2015/0078982 A1 | 3/2015 | Noyes | |
| 2015/0086468 A1 | 3/2015 | Noyes | |
| 2015/0093323 A1 | 4/2015 | Koveal, Jr. et al. | |
| 2015/0114819 A1 | 4/2015 | Denton et al. | |
| 2015/0147259 A1 | 5/2015 | Noyes | |
| 2015/0147261 A1 | 5/2015 | Denton et al. | |
| 2015/0225242 A1 | 8/2015 | Noyes | |
| 2015/0291424 A1 | 10/2015 | Noyes | |
| 2015/0321918 A1 | 11/2015 | Noyes | |
| 2016/0016794 A1 | 1/2016 | Noyes | |
| 2016/0016800 A1 | 1/2016 | Noyes | |
| 2016/0016862 A1 | 1/2016 | Noyes | |
| 2016/0023902 A1 | 1/2016 | Noyes | |
| 2016/0027934 A1 | 1/2016 | Noyes | |
| 2016/0030925 A1 | 2/2016 | Noyes | |
| 2016/0030926 A1 | 2/2016 | Noyes | |
| 2016/0031710 A1 | 2/2016 | Noyes et al. | |
| 2016/0039677 A1 | 2/2016 | Noyes | |
| 2016/0250712 A1* | 9/2016 | Cheng | B22F 1/0025 219/58 |

FOREIGN PATENT DOCUMENTS

| | | | |
|---|---|---|---|
| JP | 3339339 B2 | 10/2002 | |
| JP | 2004517789 A | 6/2004 | |
| JP | 2004360099 A | 12/2004 | |
| JP | 2005075725 A | 3/2005 | |
| JP | 2005532976 A | 11/2005 | |
| JP | 2007191840 A | 8/2007 | |
| KR | 1020050024674 A | 3/2005 | |
| KR | 1020050072056 A | 7/2005 | |
| WO | 2004096704 A3 | 11/2005 | |
| WO | 2005103348 A1 | 11/2005 | |
| WO | 2006003482 A3 | 8/2006 | |
| WO | 2007086909 A3 | 11/2007 | |
| WO | 2007139097 A1 | 12/2007 | |
| WO | 2007126412 A3 | 6/2008 | |
| WO | 2009011984 A1 | 1/2009 | |
| WO | 2006130150 A3 | 4/2009 | |
| WO | 2009122139 A1 | 10/2009 | |
| WO | 2009145959 A1 | 12/2009 | |
| WO | 2010047439 A1 | 4/2010 | |
| WO | 2010087903 A1 | 8/2010 | |
| WO | 2010120581 A1 | 10/2010 | |
| WO | 2011009071 A1 | 1/2011 | |
| WO | 2011020568 A1 | 2/2011 | |
| WO | 2011029144 A1 | 3/2011 | |
| WO | 2010146169 A3 | 4/2011 | |
| WO | 2010124258 A3 | 5/2011 | |
| WO | 2011053192 A2 | 5/2011 | |
| WO | 2013090274 | 6/2013 | |
| WO | 2013158157 A1 | 10/2013 | |
| WO | 2013158158 A1 | 10/2013 | |
| WO | 2013158438 | 10/2013 | |
| WO | 2013158439 | 10/2013 | |
| WO | 2013158441 | 10/2013 | |

OTHER PUBLICATIONS

Kauppinen et al.; Correlation Between Catalyst Particle and Single-Walled Carbon Nanotube Diameters; Carbon; 2251-2257, 2005.*
Leonhardt et al.; Synthesis, Properties and Applications of Ferromagnetic Filled Carbon Nanotubes; Chem. Vap. Deposition; 12, 380-387; 2006.*
Kroto et al.; The Production and Structure of Pyrolytic Carbon Nanotubes; Journal of Physics and Chemistry of Solids; vol. 54, Issue 12, pp. 1841-1848; 1993.*
Compton et al.; New Electrodes for Old: From Carbon Nanotubes to Edge Plane Pyrolytic Graphite; Analyst; 131, 15-21; 2006.*
Abatzoglou, Nicolas et al., "The use of catalytic reforming reactions for C02 sequestration as carbon nanotubes," Proceedings of the 2006 IASMEIWSEAS International Conference on Energy & Environmental Systems, Chalkida, Greece, May 8-10, 2006 (pp. 21-26) (available at: http://www.wseas.us/e-library/conferences/2006evia/papers/516-1 9 3.pdf).
Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.
Baker B. A. and G. D. Smith "Metal Dusting in a Laboratory Environment—Alloying Addition Effects," Special Metals Corporation, undated.
Baker, B. A. and G. D. Smith, "Alloy Solutions to Metal Dusting Problems in the PetroChemical Industry," Special Metals Corporation, undated.
Bogue, Robert, Powering Tomorrow's Sensor: A Review of Technologies—Part 1, Sensor Review, 2010, pp. 182-86, vol. 30, No. 3.
Cha, S. 1., et al., "Mechanical and electrical properties of crosslinked carbon nanotubes," Carbon 46 (2008) 482-488, Elsevier, Ltd.
Cheng, H.M. et al., "Large-scale and low-cost synthesis of single-walled carbon nanotubes by the catalytic pyrolysis of hydrocarbons," Applied Physics Letters 72:3282-3284, Jun. 22, 1998 (available at: http://carbon.imr.ac.cn/file/journal/1998/98_APL_72_3282-ChengH M.pdf).
Notice of First Office Action of corresponding, copending Chinese Application No. 201380020288.2 dated Aug. 31, 2015, 3 pages.
Text of Notice of the First Office Action of corresponding, copending Chinese Application No. 201380020288.2 dated Aug. 31, 2015, 6 pages.
Chun, Changmin, and Ramanarayanan, Trikur A., "Metal Dusting Corrosion of Metals and Alloys," 2007.
Chung, U.C., and W.S. Chung, "Mechanism on Growth of Carbon Nanotubes Using CO—H2 Gas Mixture," Materials Science Forum vols. 475-479 (2005) pp. 3551-3554.
Dai, et al., "Single-wall nanotubes produced by metal-catalyzed disproportionation of carbon monoxide," Chemical Physics Letters 260 (1996) 471-475, Elsevier.
Dresselhaus et al., Carbon Nanotubes Synthesis, Structure, Properties, and Applications. 2001, pp. 1-9, Springer.
Garmirian, James Edwin, "Carbon Deposition in a Bosch Process Using a Cobalt and Nickel Catalyst," PhD Dissertation, Massachusetts Institute of Technology, Mar. 1980, pp. 14-185.
Grobert, Nicole, "Carbon nanotubes—becoming clean," Materials Today, vol. 10, No. 1-2, Jan.-Feb. 2007, Elsevier, pp. 28-35.
Hata, Kenji, "From Highly Efficient Impurity-Free CNT Synthesis to DWNT forests, CNTsolids and Super-Capacitors," unknown date, unknown publisher, Research Center for Advanced Carbon Materials, National Institute of Advanced Industrial Science and Technology (AIST), Tsukuba, 305-8565, Japan.
Hiraoka, Tatsuki, et al., "Synthesis of Single- and Double-Walled Carbon Nanotube Forests on Conducting Metal Foils," 9 J. Am. Chem. Soc. 2006, 128, 13338-13339.
Holmes, et al.; A Carbon Dioxide Reduction Unit Using Bosch Reaction and Expendable Catalyst Cartridges; NASA; 1970; available at https:J/archive.org/details/nasa_techdoc_1971 0002858.
Huang, Z.P., et al., "Growth of highly oriented carbon nanotubes by plasma-enhanced hot filament chemical vapor deposition," Applied Physics Letters 73:3845-3847, Dec. 28, 1998.
"INCONEL® alloy 693—Excellent Resistance to Metal Dusting and High Temperature Corrosion" Special Metals Product Sheet, 2005.
Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

(56) References Cited

OTHER PUBLICATIONS

Lal, Arch It, "Effect of Gas Composition and Carbon Activity on the Growth of Carbon Nanotubes," Masters Thesis, University of Florida, 2003.

Manasse et al., Schottky Barrier Betavoltaic Battery, IEEE Transactions on Nuclear Science, vol. NS-23, No. 1, Feb. 1976, pp. 860-870.

Manning, Michael Patrick, "An Investigation of the Bosch Process," PhD Dissertation, Massachusetts Institute of Technology, Jan. 1976.

Muller-Lorenz and Grabke, Coking by metal dusting of steels, 1999, Materials and Corrosion 50, 614-621 (1999).

Nasibulin, Albert G., et al., "An essential role of C02 and H20 during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofibers/synthesis-of-alumina-nanofibers-and-composites).

International Preliminary Report on Patentability, for international Application No. PCT/US2013/000075, dated Oct. 21, 2014, 7 pages.

PCT International Search Report and Written Opinion, PCT/US2013/000075, dated Jun. 26, 2013.

Pender, Mark J., et al., "Molecular and polymeric precursors to boron carbide nanofibers, nanocylinders, and nanoporous ceramics," Pure Appl. Chem., vol. 75, No. 9, pp. 1287-1294, 2003.

Ruckenstein, E. and H.Y. Wang, "Carbon Deposition and Catalytic Deactivation during C02 Reforming of CH4 over Co/?-Al2O3 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2, 15-234.

SAE 820875 Utilization of Ruthenium and Ruthenium-Iron Alloys as Bosch Process Catalysts. Jul. 19-21, 1982.

SAE 911451 Optimization of Bosch Reaction, Jul. 15-18, 1991.

Skulason, Egill, Metallic and Semiconducting Properties of Carbon Nanotubes, Modern Physics, Nov. 2005, slide presentation, 21 slides, available at https://notendur.hi.is/egillsk/stuff/annad/Egiii.Slides2.pdf, last visited Apr. 28, 2014.

Songsasen, Apisit and Paranchai Pairgreethaves, "Preparation of Carbon Nanotubes by Nickel Catalyzed Decomposition of Liquefied Petroleum Gas (LPG)," Kasetsart J. (Nat. Sci.) 35 : 354-359 (2001) (available at: http://kasetsartjournal.ku.ac.th/kuj_files/2008/A0804251023348734.pdf).

Srivastava, A. K., et al. "Microstructural features and mechanical properties of carbon nanotubes reinforced aluminum-based metal matrix composites." Indian Journal of Engineering and Materials Sciences 15.3 (2008): 247-255.

Szakalos, P., "Mechanisms and driving forces of metal dusting," Materials and Corrosion, 2003, 54, No. 10, pp. 752-762.

XP-002719593 Thomson abstract, Database WPI Week 198920 Thomson Scientific, London, GB; AN 1989-148422 XP002719593, & JP H01 92425 A (Nippon Kokan KK) Apr. 11, 1989 (Apr. 11, 1989), one page.

Tsai, Heng-Yi, et al., "A feasibility study of preparing carbon nanotubes by using a metal dusting process," Diamond & Related Materials 18 (2009) 324-327, Elsevier.

Unknown author, "Metal Dusting," unknown publisher, undated.

Unknown author, "Metal Dusting of reducing gas furnace HK40 tube," unknown publisher, undated.

Wei, et al. "The mass production of carbon nanotubes using a nano-agglomerate fluidized bed reactor: A multiscale space-time analysis," Powder Technology 183 (2008) 10-20, Elsevier.

Wiegand et al., Fabrication of High Strength Metal-Carbon Nanotube Composites, U.S. Army Research and Development, Picatinny, New Jersey, and New Jersey Institute of Technology, Newark, New Jersey, report date Dec. 2008, 6 pages.

Wilson, Richard B., "Fundamental Investigation of the Bosch Reaction," Master's Thesis, Massachusetts Institute of Technology, Sep. 1971, pp. 12,23, 37, 43, 44, 62, 70, 80, 83-88, 98.

Zeng Z and Natesan, K., Relationship between the Growth of Carbon Nanofilaments and Metal Dusting Corrosion, 2005, Chem. Mat. 2005, 17, 3794-3801.

Examination Report for UAE/P/1028/2011, dated Feb. 11, 2018.

Search Report for UAE/P/1028/2011, dated Feb. 11, 2018.

\* cited by examiner

COMPOSITIONS OF MATTER INCLUDING SOLID CARBON FORMED BY REDUCING CARBON OXIDES

CROSS-REFERENCE TO RELATED APPLICATIONS

This application is a continuation of U.S. patent application Ser. No. 14/163,179, filed Jan. 24, 2015, now U.S. Pat. No. 9,556,031, issued Jan. 31, 2017, which is a divisional of U.S. patent application Ser. No. 13/263,311, filed Oct. 6, 2011, now U.S. Pat. No. 8,679,444, issued Mar. 25, 2014, which is a national phase entry of PCT/US2010/29934, filed Apr. 5, 2010, which, in turn, claims priority based on U.S. Provisional Patent Application Ser. No. 61/170,199, filed Apr. 17, 2009, and titled "Method for Producing Solid Carbon by Reducing Carbon Oxides." The entire disclosure of each of these applications is incorporated herein by this reference.

BACKGROUND

This disclosure relates generally to a catalytic conversion process for reducing carbon oxides to a valuable solid carbon product and, in particular, to the use of carbon oxides (e.g., carbon monoxide and carbon dioxide) as the primary carbon source for the production of solid carbon products (such as Buckminster fullerenes) using a reducing agent (such as hydrogen or a hydrocarbon) typically in the presence of a catalyst. This method may be used for commercial manufacture of solid carbon products in various morphologies and for catalytic conversion of carbon oxides to solid carbon and water.

These methods produce carbon products from carbon oxides. The methods produce carbon products, such as Buckminster fullerenes, using carbon oxides as the primary carbon source. The methods thus involve catalytic conversion of carbon oxides (primarily carbon monoxide and carbon dioxide) to solid carbon and water. The methods may use the atmosphere, combustion gases, process off-gases, well gas, and other natural and industrial sources of carbon oxides. The carbon oxides may be separated from these sources and concentrated as needed.

Solid carbon has numerous commercial applications. These applications include longstanding uses such as uses of carbon black and carbon fibers as a filler material in tires, inks, etc., many uses for various forms of graphite (such as the use of pyrolytic graphite as heat shields), and innovative and emerging applications for Buckminster fullerenes (including buckyballs and buckytubes). Prior methods for the manufacture of various forms of solid carbon typically involve the pyrolysis of hydrocarbons (often natural gas) in the presence of a suitable catalyst. The use of hydrocarbons as the carbon source is due to historically abundant availability and low cost of hydrocarbons. The use of carbon oxides as the carbon source in reduction reactions for the production of solid carbon has largely been unexploited.

The present process uses two abundant feedstocks, carbon oxides (e.g., carbon dioxide ($CO_2$) and carbon monoxide (CO)) and a reducing agent. The reducing agent is preferably a hydrocarbon gas (e.g., natural gas, methane, etc.), hydrogen ($H_2$) gas or a mixture thereof. A hydrocarbon gas serves the dual function as both an additional carbon source and as the reducing agent for the carbon oxides. Syngas comprises primarily carbon monoxide (CO) and hydrogen ($H_2$) so that the gas has both the carbon oxide and the reducing gas in mixture. Syngas may be profitably used as all or a portion of the reaction gas mixture.

Carbon oxides, particularly carbon dioxide, are abundant gases that may be extracted from point source emissions, such as the exhaust gases of hydrocarbon combustion, and from some process off gases. Carbon dioxide may also be extracted from the air. Because point source emissions have much higher concentrations of carbon dioxide than air, they are often economical sources from which to harvest the carbon dioxide. However, the immediate availability of air may provide cost offsets by eliminating transportation costs through local manufacturing of the solid carbon products from carbon dioxide in air.

Carbon dioxide is increasingly available and inexpensive as a byproduct of power generation and chemical processes where the object is to eliminate the emission of carbon dioxide to the atmosphere by capturing the carbon dioxide and subsequent sequestration (often by injection into a geological formation). The capture and sequestration of carbon dioxide is the basis for "green" coal fired power stations, for example. In current practice, capture and sequestration of the carbon dioxide entails significant cost. The process disclosed herein considers the carbon dioxide as an economically valuable co-product instead of an undesirable waste product with associated disposal costs.

The methods disclosed may be incorporated into power production and industrial processes for sequestration of carbon oxides and converting them to valuable solid carbon products. For example, the carbon oxides in the combustion or process off-gases may be separated and concentrated to become a feedstock for this process. In some cases these methods may be incorporated directly into the process flow without separation and concentration, for example, as an intermediate step in a multi-stage gas turbine power station. The direct incorporation into the process flow is particularly suitable for oxy-combustion processes.

The present catalytic conversion process may be incorporated with fossil fuel combustion processes. Many methods for integrating the catalytic conversion process with various combustion processes and power production cycles will readily occur to the skilled practitioner. These methods include adding a catalytic converter between stages in a power production cycle so that the combustion gases are passed through a catalytic converter and at least some portion of the constituent carbon oxides in the combustion gases are converted to solid carbon, or separating the carbon oxides from all, or a portion of, the combustion process effluent gases and routing the separated gases through the catalytic converters.

Combing the catalytic conversion process with a separation process may be beneficial because it would deliver a carbon separation and sequestration unit that may be more economical than existing separation and sequestration methods. The operating efficiencies may arise from the fact that the catalytic converters may use low pressure carbon oxides, so the equipment and costs associated with compression, liquefaction and transport are reduced, and from the use of the heat produced in the catalytic converters to provide at least some of the process heat for the separation process. Specific methods for combining catalytic converters with various separation processes will readily occur to the skilled practitioner. For example, a separation process, such as amine absorption, may receive at least part of the heat required for desorption from the catalytic converter, and deliver low pressure carbon oxide gases to the catalytic converter.

There are a limited number of ways that carbon, oxygen, and hydrogen can react. There is a spectrum of reactions involving these three elements wherein various equilibria have been named. Hydrocarbon pyrolysis is the range of equilibria between hydrogen and carbon that favors solid carbon production, typically with little or no oxygen present. The Boudouard reaction, also called the carbon monoxide disproportionation reaction, is the range of equilibria between carbon and oxygen that favors solid carbon production, typically with little or no hydrogen present. The Bosch reaction is the region of equilibria where all of carbon, oxygen, and hydrogen are present that favors solid carbon production. Other equilibria favor the production of carbon oxides or hydrocarbons (e.g., the Sabatier and the Fischer-Tropsch processes) with no solid carbon product.

The relationship between the hydrocarbon pyrolysis, Boudouard, and Bosch reactions may be understood in terms of a C—H—O equilibrium diagram, as shown in FIG. 21. The C—H—O Equilibrium Diagram of FIG. 21 shows various known routes to carbon nanotube ("CNT") formation. The hydrocarbon pyrolysis reactions are on the equilibrium line that connects $H_2$ and C, the left side of the triangle. The names on this line are of a few of the researchers who have published results validating CNT formation at various points on this line. Many patents have been issued for the use of the hydrocarbon pyrolysis reaction in the production of CNTs. The Boudouard or carbon monoxide disproportionation reactions are on the equilibrium line that connects $O_2$ and C, right side of the triangle. The equilibrium lines for various temperatures that traverse the diagram show the approximate regions in which solid carbon will form. For each temperature, solid carbon will form in the regions above the associated equilibrium line, but will not form in the regions below the equilibrium line.

The present methods, based generally on the Bosch reaction, are in the interior region of the triangle where equilibrium is established between solid carbon, hydrogen, and oxygen in various combinations. What is disclosed here is that the central region has several points that in fact are highly favorable for the formation of CNTs and several other forms of solid carbon product, and that through careful selection of the catalysts, reaction gases, and reaction conditions, the type of solid carbon produced can be selectively controlled. Thus these methods open new routes to the production of valuable solid carbon products such as CNTs.

The Ellingham diagram defines the equilibrium formation enthalpy of solid carbon from carbonaceous gases as a function of temperature. This diagram is well known to the art and is a useful reference in understanding this range of equilibria.

The methods of the present invention employ the Bosch reaction to produce valuable solid carbon products. The Bosch reaction ($CO_2+2H_2 \leftrightarrows C_{solid}+2H_2O$) reduces carbon dioxide with hydrogen for the production of solid carbon and water. The temperatures for the Bosch reaction reported in the literature range from 450° C. to over 2000° C. The reaction rates are typically enhanced and reaction temperatures reduced by the use of a catalyst such as iron.

Previously, the Bosch reaction was used with the objective of recovering oxygen from respiratory processes in enclosed isolated environments such as submarines, spacecraft and lunar or Mars bases (see, for example, U.S. Pat. No. 4,452,676, "Carbon Dioxide Conversion System for Oxygen Recovery," Birbarta et al.; and U.S. Pat. No. 1,735,925, "Process of Producing Reduction Products of Carbon Dioxide," Jaeger). Typically, the solid carbon form is specified as graphite deposited on a solid catalyst bed or collection plate, and is noted as a nuisance that fouls the catalyst and must be disposed of There is little previous disclosure of the various forms of solid carbon that might be produced through modifications to this process, or of solid carbon as the principal desired product of these reactions.

The Boudouard reaction is also called the carbon monoxide disproportionation reaction and it proceeds as:

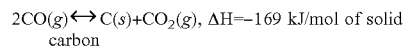

$2CO(g) \leftrightarrow C(s)+CO_2(g)$, $\Delta H=-169$ kJ/mol of solid carbon

The present method differs from Boudouard reaction in at least three ways: i) carbon monoxide is not necessary to the method, though it may be used as a carbon source; ii) a separate reducing agent is used to reduce the carbon monoxide to solid carbon and water; and iii) carbon dioxide is not a product of the reaction.

A recent set of patents discloses the use of carbon monoxide as the carbon source for the formation of carbon nanotubes. The production of solid carbon from carbon monoxide is via the carbon monoxide disproportionation or Boudouard reaction. Smalley (U.S. Pat. No. 6,761,870) discloses the use of the carbon monoxide disproportionation reaction in the presence of a catalyst in Gas-phase nucleation and growth of single-wall carbon nanotubes from high pressure CO for the production of single-walled carbon nanotubes.

"A Novel Hybrid Carbon Material," Nasibulin et al. (Nature Nanotechnology 2, 156-161, 2006) discloses the formation of what they term nanobuds in two different one-stop continuous methods, during which fullerenes were formed on iron-catalyst particles together with SWNTs (single-walled nanotubes) during carbon monoxide disproportionation. This use of carbon monoxide disproportionation is typical of the literature. Nasibulin further discloses in "An essential role of $CO_2$ and $H_2O$ during single-walled CNT synthesis from carbon monoxide" (Chemical Physics Letters 417 (2005) 179-184) the important influences of carbon dioxide and water in the growth of carbon nanotubes, but specifically notes that at concentrations above about 15,000 ppm, the presence of $CO_2$ inhibits the formation of carbon nanotubes.

Tennent in U.S. Pat. No. 4,663,230, "Carbon Fibrils, Method for Producing Same and Compositions Containing Same" discloses and does specify the use of carbon oxides in the production of carbon fibrils, though his reaction is specified as a reaction between the carbon-containing compound and the carbon in the specially prepared catalyst of his invention, where the catalyst was essentially a carbon particle coated with a suitable metal. Tennent specifically claims "wherein the compound capable of reacting with carbon is $CO_2$, $H_2$ or $H_2O$."

Resasco et al. (U.S. Pat. No. 6,333,016) in "Method of Producing Carbon Nanotubes," discloses carbon monoxide disproportionation in the presence of various Co:Mo catalysts. They make no claims with regard to the use and presence of a reducing agent in the reaction gas mixture.

In contrast, the present method is not limited to carbon monoxide as the carbon source gas. The present method uses a reducing agent other than a carbon oxide. Also, the present method relies on the mixing of the carbon oxide with a reducing agent in the presence of a catalyst for the production of the valuable solid carbon product.

Hydrocarbon pyrolysis is known and is commercially used in the production of carbon black and various carbon nanotube and Buckminster fullerene products. Various methods exist for creating and harvesting various forms of solid carbon through the pyrolysis of hydrocarbons using temperature, pressure, and the presence of a catalyst to govern the resulting solid carbon morphology. For example, Kauffman et al. (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

Wiegand et al. (U.S. Pat. No. 2,440,424) disclose an improved process for the manufacture of carbon black that comprises rapidly and thoroughly admixing a hydrocarbon gas, natural gas for example, in regulated amounts with a high velocity, highly turbulent blast flame containing oxygen substantially in excess of that required for complete combustion of the blast gases. This blast gas is primarily for heating the pyrolysis of a secondary "make gas" of a hydrocarbon gas that is introduced into the heated chamber in quantities far in excess of the available oxygen, so that a pyrolysis reaction occurs instead of combustion.

Brownlee et al. (U.S. Pat. No. 1,478,730) discloses a method for the production of a special carbon black from hydrocarbon feedstocks that results in enhanced yields, forming the carbon particles by pyrolysis of the hydrocarbons in the gas stream (not by combustion) and rapidly cooling the gases to separate the special carbon black before it comes into contact with the regular carbon black that forms on the furnace refractory and other surfaces in the combustion zone. Brownlee claims this special carbon black as a proprietary invention.

Bourdeau et al. (U.S. Pat. No. 3,378,345) discloses a method for growing pyrolytic graphite whiskers as elongated crystals growing perpendicular to a substrate using hydrocarbon gases with non-stoichiometric quantities (50:1 ratio of hydrocarbon gas to water or carbon dioxide) of either water or carbon dioxide or a mixture thereof. The reaction occurs at low pressures (0.1 mm to 20 mm mercury) and starts at temperatures of 799° C. to 1200° C. gradually ramping (3° C. per minute) to at least 1400° C.

Diefendorf (U.S. Pat. No. 3,172,774) discloses methods for depositing pyrolytic graphite on a composite article using a low pressure (0.2 cm to 70 cm mercury) at 1450° C. to 2000° C., using a hydrocarbon gas. The low pressure is important in allowing the carbon to form on the surface of the composite article in preference to forming soot in the gas phase.

Huang et al. (U.S. Patent Publication 2006/0269466) discloses the manufacturing of carbonaceous nanofibers using hydrocarbon as the carbon source for the carbon material.

Li et al. (U.S. Patent Publication 2008/0118426 discloses the manufacture of carbon nanotubes of varied morphology using the pyrolysis of a hydrocarbon source gas. Li does not specify they type of hydrocarbon source gas, though the specification of pyrolysis at the reaction temperatures of the description implies a hydrocarbon gas.

Fujimaki et al. (U.S. Pat. No. 4,014,980) discloses a method for manufacturing graphite whiskers based on a reaction "mixing one or more of gasified compounds having a condensed polycyclic structure of two to five benzene rings with a large amount of inert gas containing a small amount of CO, $CO_2$ or $H_2O$." Fujimaki does not teach the use of the reduction reaction, the basis for the claimed methods, and does not teach the use of carbon oxides as the primary carbon source for the formation of the graphite whiskers.

Hydrocarbon pyrolysis is by definition the thermal decomposition of hydrocarbons. The present method is a departure from this art of using hydrocarbon pyrolysis in the manufacture of solid carbon products in that it uses carbon oxides as the carbon source for the formation of the various solid carbon morphologies. While the present method may use some hydrocarbon gases, such gases are used as a reducing agent for the carbon oxide gases with the secondary benefit of contributing carbon to the solid carbon product. Prior hydrocarbon pyrolysis typically does not mention or specify the importance of carbon oxides in the selective formation of the desired carbon product.

The Bosch reaction has been extensively studied, and several patents have been issued for applications of the reaction in environments where it is necessary or desirable to reclaim oxygen from respiration, for example, in a submarine or spacecraft environment. Such reclamation is generally accomplished by passing the carbon dioxide laden air through a carbon dioxide concentrator and then transferring the concentrated carbon dioxide to a carbon dioxide reduction system. A number of carbon dioxide reduction processes have been used, including both chemical and electrochemical means.

Holmes et al. in "A Carbon Dioxide Reduction Unit Using Bosch Reaction and Expendable Catalyst Cartridges" (Convair Division of General Dynamics Corporation, prepared for Langley Research Center, November 1970), discloses the use of the Bosch reaction for recovery of oxygen from carbon dioxide.

Birbara et al. (U.S. Pat. No. 4,452,676) discloses a method of recovering oxygen from carbon dioxide using the Sabatier reaction to hydrogenate the carbon dioxide to methane and water and subsequently pyrolysis the methane and deposit the resulting solid carbon on a non-catalytic glass substrate. The methane is pyrolyzed over a high temperature stable glass surface heated to about 1000° C. to 1200° C. to produce hydrogen gas and a high density carbon, i.e., having a density greater than about 2 grams per cubic centimeter. This results in lessening of the storage problem for the carbon material because of its high density. The hydrogen gas produced is also recycled back to the incoming carbon dioxide for reaction.

NASA has sponsored research into the Bosch Reaction at various times with the view to using this process to recover oxygen from respiratory $CO_2$ in space ships. This work resulted in a series of reports, published papers, and dissertations. This work was focused on the production of water for oxygen recovery.

Selected documents related to the NASA sponsored research on the Bosch reaction include:

A carbon dioxide reduction unit using Bosch reaction.
Methods of Water Production, a survey of methods considered for the ISS including Bosch and Sabatier reactions, Oregon State University.
Comparison of CO2 Reduction Process—Bosch and Sabatier, SAE International, July 1985, Document Number 851343.
Bunnel, C. T., Boyda, R. B., and Lee, M. G., Optimization of the Bosch CO2 Reduction Process, SAE Technical Paper Series No. 911451, presented 21st International Conference on Environmental Systems, San Francisco, Calif., Jul. 15-18, 1991.
Davenport, R. J.; Schubert, F. H.; Shumar, J. W.; Steenson, T. S., Evaluation and characterization of the methane-carbon dioxide decomposition reaction, Accession Number: 75N27071.
Noyes, G. P., Carbon Dioxide Reduction Processes for Spacecraft ECLSS: A Comprehensive Review, SAE Technical Paper Series No. 881042, Society of Automotive Engineers, Warrendale, Pa., 1988.

Arlow, M., and Traxler, G., CO2 Processing and $O_2$ Reclamation System Selection Process for Future European Space Programmes, SAE Technical Paper Series No. 891548, Society of Automotive Engineers, Warrendale, Pa., 1989.

Optimization of the Bosch CO2 Reduction Process SAE International, July 1991, Document Number 911451.

Garmirian, J. E., "Carbon Deposition in a Bosch Process Using a Cobalt and Nickel Catalyst," Dissertation, MIT, March 1980.

Garmirian, J. E., Reid, R. C., "Carbon Deposition in a Bosch Process Using Catalysts Other than Iron," Annual Report, NASA-AMES Grant No. NGR22-009-723, Jul. 1, 1978.

Garmirian, J. E., Manning, M. P., Reid, R. C., "The use of nickel and cobalt catalysts in a Bosch reactor," 1980.

Heppner, D. B.; Hallick, T. M.; Clark, D. C.; Quattrone, P. D., Bosch—An alternate CO2 reduction technology, NTRS Accession Number: 80A15256.

Heppner, D. B.; Wynveen, R. A.; Schubert, F. H., Prototype Bosch CO2 reduction subsystem for the RLSE experiment, NTRS Accession Number: 78N15693.

Heppner, D. B.; Hallick, T. M.; Schubert, F. H., Performance characterization of a Bosch CO sub 2 reduction subsystem, NTRS Accession Number: 80N22987.

Holmes, R. F.; King, C. D.; Keller, E. E., Bosch CO2 reduction system development, NTRS Accession Number: 76N22910.

Holmes, R. F.; Keller, E. E.; King, C. D., A carbon dioxide reduction unit using Bosch reaction and expendable catalyst cartridges, General Dynamics Corporation, 1970, NTRS Accession Number: 71N12333.

Holmes, R. F., Automation of Bosch reaction for CO2 reduction, NTRS Accession Number: 72B10666.

Holmes, R. F.; Keller, E. E.; King, C. D., Bosch CO2 reduction unit research and development. NTRS Accession Number: 72A39167.

Holmes, R. F.; King, C. D.; Keller, E. E., Bosch CO2 reduction system development, NTRS Accession Number: 75N33726.

King, C. D.; Holmes, R. F., A mature Bosch CO2 reduction technology, NTRS Accession Number: 77A19465.

Kusner, R. E., "Kinetics of the Iron Catalyzed Reverse Water-Gas Shift Reaction", PhD Thesis, Case Institute of Technology, Ohio (1962).

Isakson, W. E., Snacier, K. M., Wentrcek, P. R., Wise, H., Wood, B. J. "Sulfur Poisoning of Catalysts", SRI, for US ERDA, Contract No. E(36-2)-0060, SRI Project 4387, 1977.

Manning, M. P., Garmirian, J. E., Reid, R. C., "Carbon Deposition Studies Using Nickel and Cobalt Catalysts", Ind. Eng. Chem. Process Des. Dev., 1982, 21, 404-409.

Manning, M. P.; Reid, R. C., Carbon dioxide reduction by the Bosch process, NTRS Accession Number: 75A40882.

Manning, M. P., "An Investigation of the Bosch Process", MIT Dissertation (1976).

Manning, M. P.; Reid, R. C.; Sophonpanich, C., Carbon deposition in the Bosch process with ruthenium and ruthenium-iron alloy catalysts, NTRS Accession Number: 83N28204.

Meissner, H. P.; Reid, R. C., The Bosch process, NTRS Accession Number: 72A39168.

Minemoto, M., Etoh, T., Ida, H., Hatano, S., Kamishima, N., and Kita, Y., Study of Air Revitalization System for Space Station, SAE Technical Paper Series No. 891576, Society of Automotive Engineers, Warrendale, Pa., 1989.

Otsuji, K., Hanabusa, O., Sawada, T., Satoh, S., and Minemoto, M., "An Experimental Study of the Bosch and the Sabatier CO2 Reduction Processes", SAE Technical Paper Series No. 871517, presented 17th Intersociety Conference on Environmental Systems, Seattle, Wash., July 1987.

Ruston, W. R., Warzee, M., Hennaut, J. Waty, J., "The Solid Reaction Products of the Catalytic Decomposition of Carbon Monoxide on Iron at 550 C.", Carbon, 7, 47 (1969).

Ruston, W. R., Warzee, M., Hennaut, J., Waty, J., "Basic Studies on the Growth of Carbon Deposition from Carbon Monoxide on a Metal Catalyst", D. P. Report 394, Atomic Energy Establishment, Winfrith (1966).

Sacco, A., "An Investigation of the Reactions of Carbon Dioxide, Carbon Monoxide, Methane, Hydrogen, and Water Over Iron, Iron Carbides, and Iron Oxide", PhD Thesis, MIT (1977).

Sacco, A., "An Investigation of the Reactions of Carbon Dioxide, Carbon Monoxide, Methane, Hydrogen, and Water over Iron, Iron Carbides, and Iron Oxide", PhD Thesis, MIT (1977).

Sophonpanich, C., Manning, M. P., and Reid, R. C., Utilization of Ruthenium and Ruthenium-Iron Alloys as Bosch Process Catalysts, SAE Technical Paper Series No. 820875, Society of Automotive Engineers, Warrendale, Pa., 1982.

Schubert, F. H.; Clark, D. C.; Quattrone, P. D., Integrated testing of an electrochemical depolarized CO2 concentrator/EDC/ and a Bosch CO2 reduction sub system/BRS/, NTRS Accession Number: 77A19483.

Schubert, F. H.; Wynveen, R. A.; Hallick, T. M., Integration of the electrochemical depolarized CO2 concentrator with the Bosch CO2 reduction subsystem, NTRS Accession Number: 76N22907.

Wagner, Robert C.; Carrasquillo, Robyn; Edwards, James; Holmes, Roy, Maturity of the Bosch CO2 reduction technology for Space Station application, NTRS Accession Number: 89A27804, SAE Technical Paper Series No. 88099.

Global Warming & Greenhouse Gases: Integrated-Technologies Remediation of Greenhouse Gas Effects.

Walker, P. L., Rakszawski, J. F., and Imperial, G. R., Carbon Formation from Carbon Monoxide-Hydrogen Mixtures over Iron Catalysts. Properties of Carbon Formed", J. Phys. Chem., 73, 133 (1959).

In these prior processes, the objective is the recovery of oxygen, while the solid carbon is considered to be simply a nuisance product and disposal problem. While the methods presented here use the Bosch reaction, they differ from prior methods in that the present methods are concerned with the types and quality of solid carbon that can be produced, and the methods for controlling the solid carbon morphology through the use of catalyst, gas mixtures, and process variables (e.g., temperature, pressure, and retention times) to assure economically valuable solid carbon products are produced. The present methods identify and validate the range of solid carbon products, including carbon nanotubes, that may be produced through control of the Bosch reaction.

SUMMARY

The present disclosure provides a method and apparatus for the efficient, industrial scale production of solid carbon products of various morphologies using carbon oxides as the primary carbon source through a reduction process, where the carbon oxides are reduced to the desired solid carbon product using a reducing agent in the presence of a catalyst. The type, purity, and homogeneity of solid carbon product are controlled by the reaction conditions (time, temperature, pressure, partial pressure of reactants) and the catalyst (including the size, method of formation, and form of the catalyst).

The present method uses the Bosch reaction to produce solid carbon products, including carbon nanotubes, by the reduction of carbon dioxide with any of a variety of reducing gases, such as hydrogen or methane, in the presence of a catalyst and under reaction conditions optimized for the particular desired type of solid carbon. This catalytic conversion process may be incorporated with a variety of separation technologies, and with a variety of carbon dioxide generation processes.

One of the solid carbon product morphologies of particular note are single wall carbon nanotubes. Apparently, use of a catalyst that has a dimension of approximately 1.2 to 1.6 times the diameter of the desired carbon nanotube diameter results in production of single wall carbon nanotubes. The catalyst may be in the form of catalyst nanoparticles of the desired dimension or in the form of domains within a solid catalyst such as a stainless steel formulation, where the grain size of the steel has the characteristic dimension for the diameter of CNT desired. Catalyst nanoparticles may be formed in or near the reaction zone by injecting an aerosol solution where the concentration of catalyst precursors in each aerosol droplet is such as is required to yield the desired nanoparticle size when the solute (if any) evaporates and the catalyst precursors decompose to form the resulting catalyst nanoparticle. Typically the temperature must be decreased as the size of the catalyst particles decrease. By selecting the catalyst and the reaction conditions the process may be tuned to deliver relatively specific morphologies of carbon.

Carbon nanotubes are valuable because of their unique material properties, including strength, current carrying capacity, and thermal and electrical conductivity. Current bulk use of carbon nanotubes includes use as an additive to resins in the manufacture of composites. Research and development on the applications of carbon nanotubes is very active with a wide variety of applications in use or under consideration. One obstacle to widespread use of carbon nanotubes has been the cost of manufacture. The present methods may help reduce that cost.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

Figure 1:
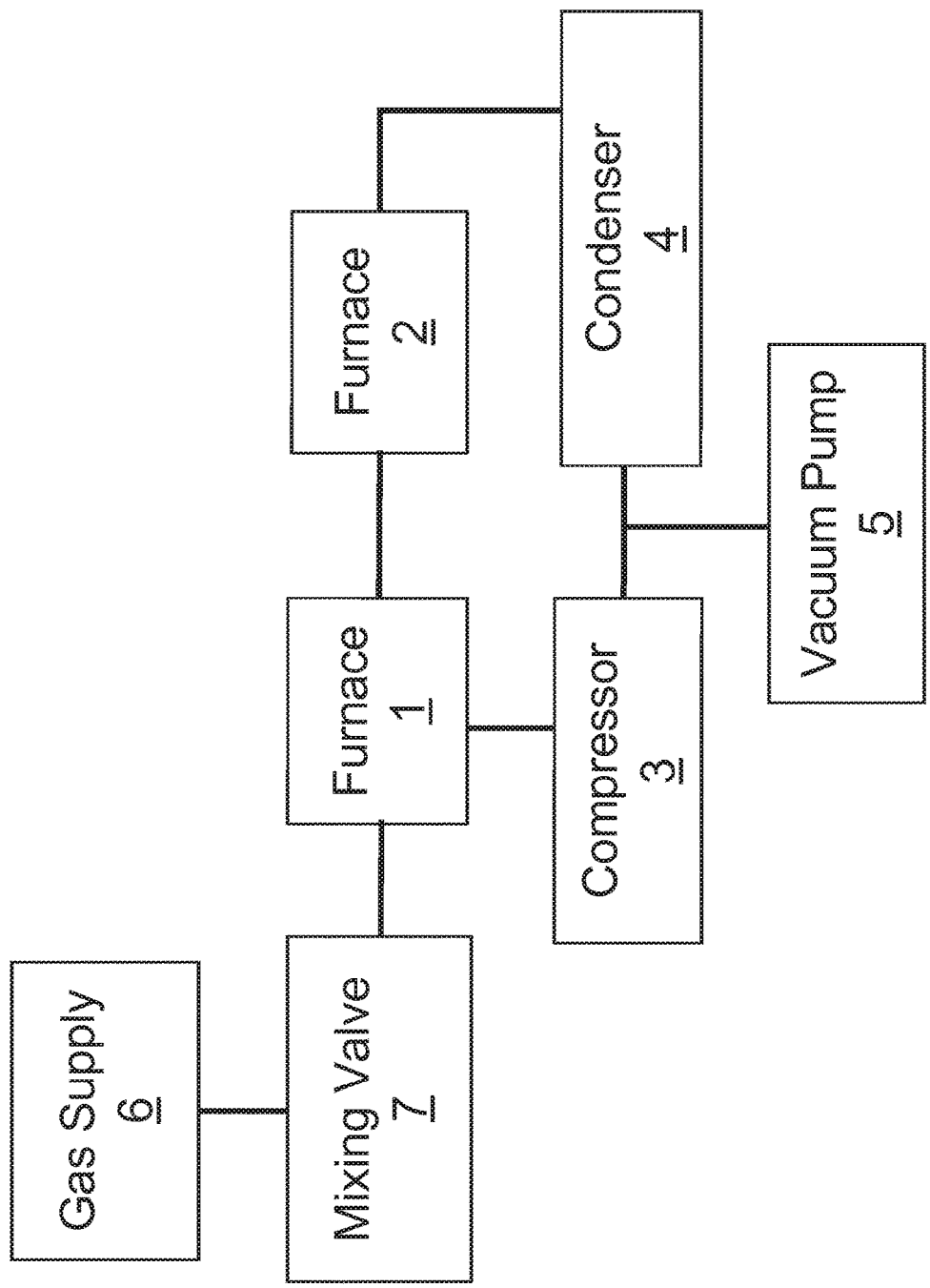
FIG. 1 depicts a schematic view of an exemplary experimental setup for the examples disclosed in this application.

The Bosch reaction uses hydrogen to reduce carbon oxides to solid carbon and water. This reaction occurs at temperatures in excess of approximately 650° C. in the presence of a catalyst. The reaction is mildly exothermic (heat producing) and proceeds with the stoichiometry:

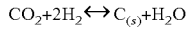

$$CO_2 + 2H_2 \leftrightarrow C_{(s)} + H_2O$$

with the release of approximately $2.3 \times 10^3$ joules/gram of solid carbon ($C_{(s)}$). The reaction is reversible with the solid carbon being oxidized by the water and carbon dioxide (in an oxygen shift reaction), so although reaction temperatures above about 450° C. are necessary to produce solid carbon, if the temperature is too high the inverse reaction increases and the overall reaction rate is lower (the equilibrium of the reaction shifts to the left).

In general terms, the present method involves creation of solid carbon, and in particular carbon nanotubes of different shapes or morphologies, by forming carbon oxides by combusting a combustible mixture of a primary hydrocarbon and oxygen or by taking existing carbon oxides from some other source, and injecting the carbon oxides and a reducing agent into a reaction zone that has been preheated to the desired reaction temperature. The reaction typically occurs in the presence of a catalyst as the catalyst composition and size is of importance in controlling the morphology of the resulting solid carbon. The reaction conditions (temperature, pressure, and residence time of the reaction gases in the reaction zone) are controlled based on the characteristics of the desired solid carbon product. The reaction gas mixture is typically cycled through the reactor and passed through a condenser with each cycle to remove excess water and to control the partial pressure of the water vapor in the reaction gas mixture.

Solid carbon may be produced in many different morphologies through the carbon oxide reduction process of the present method. Some of the solid carbon morphologies that may be produced include:

Graphite, including pyrolytic graphite;
graphene;
carbon black;
fibrous carbon;
Buckminster fullerenes including buckyballs, single wall carbon nanotubes, and multi-wall carbon nanotubes.

Hydrogen is only one of the reducing agents suitable for the reduction reaction of the present method. Hydrocarbon gases may be used in the reduction reaction where they provide both the hydrogen and a portion of the carbon. A reducing gas mixture of one or more of the commonly available hydrocarbon gases such as are found in natural gas may be an economical choice in some applications. In one embodiment, the reducing gas comprises methane with the stoichiometry:

$$CO_2 + CH_4 \leftrightarrow 2C_{(s)} + 2H_2O$$

with the release of an undetermined amount of heat in the exothermic reaction.

The reaction kinetics favorable to the formation of the desired species of solid carbon may be established through the use of a suitable catalyst. For example, the reaction may be accelerated and made to operate at a lower temperature in the presence of a group VIII element (such as iron) or compound containing a group VIII element (such as iron carbide). Catalysts formed from mixtures of these elements may be designed to yield the desired solid carbon morphology. With the use of a catalyst, the reaction typically proceeds to completion in under 5 seconds, and the reaction time can be as short as a few tenths of a second under the right process conditions and catalyst.

Typically, the solid carbon formed by the Bosch reaction is in the form of graphite. According to the present method, the morphology of the solid carbon product may be controlled by the reaction conditions, and by varying the catalysts and how the catalyst is brought into contact with the hydrogen and carbon oxides. In one embodiment, the catalyst is produced in the reaction zone by chemical reactions of a catalyst precursor compound such as ferrocene or some other metallocene, or some other metal-containing precursor such as iron pentacarbonyl and coagulation of the reaction products to form the catalyst as nanoparticles entrained in the reaction gases or deposited on surfaces within the reaction zone.

Using a catalyst precursor to form the catalyst in the reaction zone tends to result in a variety of catalyst particle sizes, which in turn results in a corresponding distribution in solid carbon sizes (such as the pore size of carbon nanotubes). When a catalyst precursor is introduced into the reaction zone, some portion of the catalyst may form on the surface of solid carbon products in the reaction zone. The catalyst then tends to grow additional solid carbon particles from the surface. This leads to branched morphologies such as branched carbon nanotubes.

In some cases the catalyst on the surface of the carbon product forms a buckysphere that is partially merged with the tube structure forming a nanobud. The introduction of additional catalyst precursors at later stages in the reduction reactor with the intent of forming the desired branched or budded morphology is a variation on the present method that will readily occur to a skilled practitioner.

Catalysts can be formed from a wide variety of catalyst precursors. Such catalyst precursors decompose to form the desired catalysts. The decomposition may occur as a method of creating the catalysts, which are subsequently introduced into the reaction zone. The catalyst precursors may be selected such that their decomposition temperature is below the temperature of the reaction zone, so that when the catalyst precursors are introduced to the reaction zone, they decompose and form the catalyst particles. The use of catalyst precursors is a good way to control the size of the catalyst particles. The control of the catalyst particle or catalyst grain size is an element in controlling the morphology and diameter of the carbon nanotubes that grow on the catalyst.

Catalyst precursors are compounds containing the metals noted to be effective catalysts. For example, some of the metals noted as effective catalysts occur as metallocenes (e.g., ferrocene), as carbonyls (e.g., cobalt carbonyl), as oxides (e.g., iron oxides aka rust), etc., that decompose at temperatures below the reaction temperatures. A wide range of suitable compounds will occur to the skilled practitioner in selecting catalyst precursors and creating mixtures of catalyst precursors that result in the desired catalyst upon decomposition.

It has been noted that small amounts of substances such as sulfur added to the reaction zone tend to be catalyst promoters that accelerate the growth of carbon products on the catalysts. Such promoters may be introduced into the reactor in a wide variety of compounds. Such compounds should be selected such that the decomposition temperature of the compound is below the reaction temperature. For example, if sulfur is selected as a promoter for an iron based catalyst, the sulfur may be introduced into the reaction zone as a thiophene gas, or as thiophene droplets in a carrier gas.

The literature on Buckminster fullerene and carbon nanotube growth contains many specific methods for forming suitable catalysts. For example, instructions for using catalyst precursors, catalyst promoters, hot wire gas methods, etc., are known to the art. Specific adaptations of these standard methods will readily occur to the skilled practitioner.

The nucleation of the catalyst may be promoted by the use of pulsed laser light, where the pulse passes through the decomposed, or decomposing, catalyst precursors and the resulting catalyst vapors in the gases. This use of laser light enhances the size uniformity of the resulting catalyst nanoparticles.

It appears that the optimum reaction temperature is dependent on the composition of the catalyst and on the size of the catalyst particles. Catalysts with small particle size tend to have optimum reaction temperatures at significantly lower temperatures than the same catalyst material with a larger particle size. One of skill may need to carry out specific experiments with each catalyst and each catalyst size to determine that optimum. For example, the reaction occurs at temperatures in the range of approximately 400° C. to 800° C. for iron based catalysts, depending on the particle size and composition and the desired solid carbon product. That is, in general, graphite and amorphous solid carbon form at lower temperatures, and carbon nanotubes form at higher temperatures).

In general, the reaction proceeds at a wide range of pressures from near vacuum, to significant pressures. Typically, increases in pressure increase the reaction rates. At this time, however, it is unknown if there is an upper limit to the benefit of increased pressure on the reaction.

In another embodiment, the product carbon morphology is primarily carbon nanotubes of relatively consistent diameter. The tube diameter is controlled by controlling the catalyst particle size by physical dispersion and dispersing an aerosol of pre-prepared catalyst precursor particles such as $Fe_3O_4$ nanoparticles into the reaction zone. This dispersion of the catalyst particles may occur in one of the reaction gases or in a carrier gas prior to injection into the reaction zone.

Carbon nanotubes grow from a nucleating site that is the catalyzing particle. This catalyzing particle may be a domain in a piece of steel or steel wool for example, or a discrete nanoparticle of iron deposited on an inert substrate such as a quartz disk. The size of the carbon nanotube will be proportional to the size of the nucleating site. The ratio between the catalyst particle size and the CNT diameter is observed to be about 1.3 to 1.6. A possible theoretical basis for the correlation of particle size and pore diameter was suggested by Nasibulin et al., in "Correlation between catalyst particle and single-walled carbon nanotube diameters," though Nasibulin's estimate of 1.6 is higher than was typically experimentally observed.

Steel is a readily available catalyst with many different formulations comprising various metals known to be effective catalysts for the Bosch reaction. With the present methods, steel and stainless steel in various grades and through various processing methods and in various forms act as a catalyst for the growth of solid carbon, specifically for the growth of carbon nanotubes. Steels with smaller grain sizes tend to produce smaller diameter carbon nanotubes. The grain size is both a function of the chemistry of the steel and the heat treating methods under which the grains formed. Mild steels often produce carbon nanotubes with diameters over 100 nm, while stainless steels (such as 304 or 316L) produce carbon nanotubes with diameters in the range of 20 nm.

Various forms of steel act as suitable catalysts for the growth of carbon nanotubes. For example, steel wool, steel plate, and steel shot (as is used in sand blasting) have provided satisfactory growth rates and consistent quality. The morphology of the carbon nanotubes grown on steel is dependent on the chemistry of the steel and the way it was processed. This may be due to any of a number of factors not presently fully understood; however, it appears to be related to the grain size and boundary shapes within the metal, where the characteristic size of these features controls the characteristic diameter of the population of carbon nanotubes grown on the surface of such steel samples. Appropriate experiments to determine the correct chemistry for the steel and processing methods for the steel to achieve the desired carbon nanotube morphology and controlled diameter will readily occur to the skilled practitioner.

Rust on steel has been observed to be a good catalyst for the formation of carbon nanotubes by the methods disclosed. Although the mechanism is not presently understood, it may be because the iron oxides comprising the rust are in effect a catalyst precursor. As the rusted samples are heated, the iron oxides decompose and the iron atoms coalesce to form small iron particles suitable for the catalysis of carbon nanotube growth.

When using a solid catalyst, such as a wafer of steel, the carbon nanotubes appear to grow in a series of generations. While the mechanism is not fully understood, it appears that the reaction gases interact with the exposed surface particles and the carbon nanotubes begin to grow on the surface. As the growth continues it appears that a clump of neighboring tubes become entangled and lift the catalyst particles off of the surface, exposing a new layer of catalyst particles, with which reaction gases are then able to interact. As each layer lifts off of the surface, the carbon nanotubes become highly entangled in small clumps that look like "pillows" or cockleburs under 800 to 1000 times magnification. If a sample is left in the reaction zone, these layers continue to form and lift off until the catalyst is consumed and various structures (such as forests, fibers or piles) composed of carbon nanotube "pillows" results. The observation that the pillows detach from the underlying catalyst substrate means that a fluidized bed reactor where the pillows are elutriated from the substrate, entrained in the gas flow, and subsequently harvested from the gas mixture may be an economical reactor design for growing carbon nanotube pillows.

Figure 3:
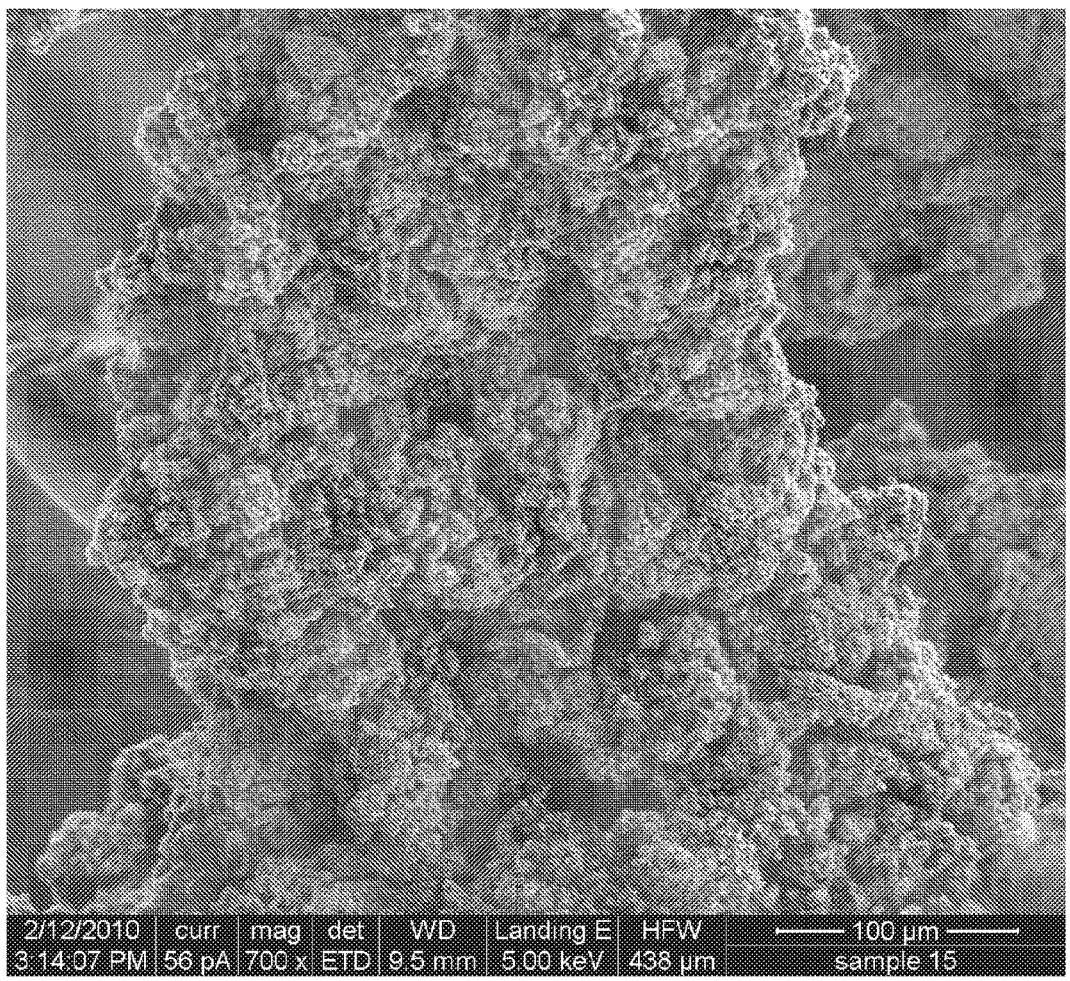
FIG. 3 depicts a top view of a forest at 700× magnification showing a pillow morphology of CNTs produced as a result of experimental Example 1.
Figure 18:
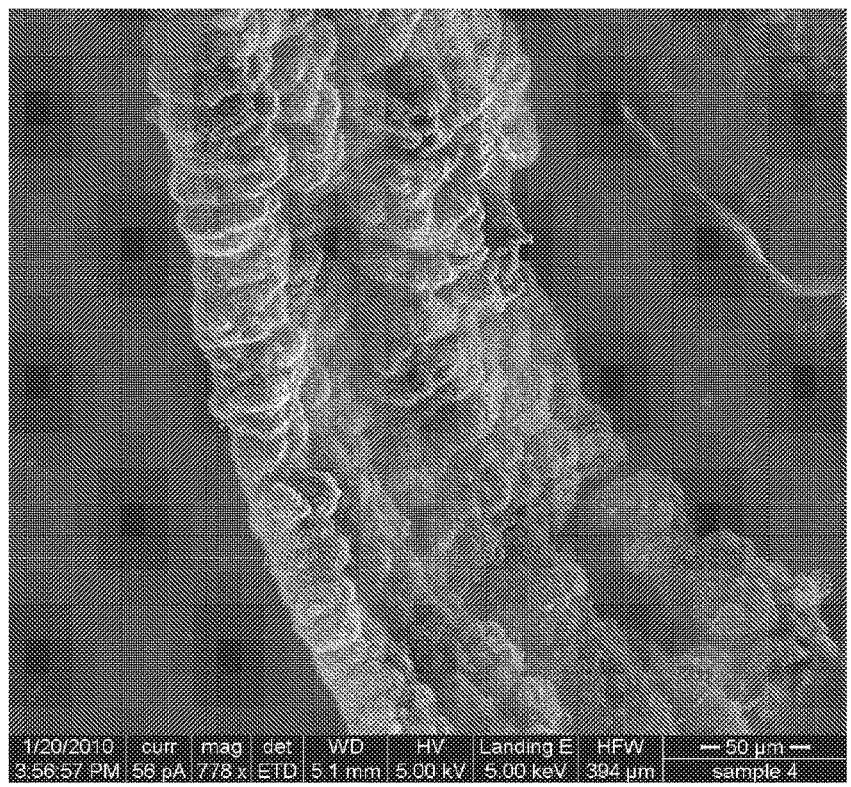
FIG. 18 depicts an image of the fibrous growth from Example 6 at 778× magnification showing the "pillow" morphology as the substructure.

As depicted in, for example, FIGS. 3 and 18, the pillow morphology is characterized by the presence of carbon nanotubes that are highly entangled in clusters, typically with a dimension for the clusters of under 1 mm. Hence, as depicted in the Figures, the pillows appear as numerous bulbous or billowing conglomerations of the nanotubes, not too dissimilar to the appearance of the outer periphery of cumulous clouds. The pillows may be comprised of carbon nanotubes of many different diameters, lengths and types. The pillows often appear in the form of discrete units in forests, piles, and filaments grown on a substrate. Steels of many different compositions (e.g., mild steel, 304 stainless, 316L stainless) and in many of the various forms (e.g., plate, steel wool, and steel shot) tend to yield carbon nanotube pillows under a wide range of reaction gas mixes and reaction temperatures.

The observed carbon nanotube pillow morphology felts very easily. For example, if a sample of carbon nanotube pillows is dispersed into an ethanol solution by gentle stirring, and the solution is subsequently shaken, the pillows agglomerate and interlock so that the distinct growth boundaries of the pillows are merged and much more extensive structures are formed. The pillow morphology may be particularly suitable for forming various types of carbon nanotube paper, felts, electrodes, etc., that may be developed or under development. The potential uses of these pillows will readily occur to a person aware of the current art in the various applications of carbon nanotubes.

A wide variety of reactor designs may be used to facilitate the formation and collection of the desired solid carbon products. Aerosol and fluidized bed reactors are particularly suitable for high volume continuous production of the solid carbon product. A fluid wall reactor has the advantages of providing for the introduction of various substances (catalysts, additional reactants) and of minimizing or eliminating the accumulation of solid carbon products on the reactor walls.

The catalytic converters may employ different designs known in the art. Examples of suitable designs include:

Aerosol reactors in which the catalyst is formed in a gas phase from catalyst precursors or in which the catalyst is preformed and selected for a specific size distribution, mixed into a liquid or carrier gas solution, and then sprayed into the reactor (for example, via electrospray). The catalyst may then remain distributed in the gas phase, or deposited on solid surfaces in the reaction zone for the growth phase of the carbon product, and subsequent transport of the product out of the reaction zone.

Fluidized bed reactors in which the catalyst or catalyst coated particles are introduced into the reactor and the solid carbon is grown on the surface of the particles. The solid carbon is then either elutriated in the reactor, and carried out of the reactor entrained in the reaction gases, or the catalyst particles are harvested and the solid carbon removed from the surface.

Batch reactors in which the catalyst is either a fixed solid surface (for example, a sheet of steel, or steel wool) or is mounted on a fixed solid surface (for example, catalyst nanoparticles deposited on an inert substrate), with the solid carbon grown on the catalyst, and the catalyst and solid carbon periodically removed from the reactor.

Continuous reactors where a solid catalyst or catalyst mounted on a solid substrate is moved through the flowing gas stream, the resulting solid carbon product harvested, the solid surface prepared, and reintroduced to the reactor. The solid substrate may be the catalyst material (e.g., a stainless steel shape) or a surface on which the catalyst is mounted. Appropriate shapes for the solid surfaces include wafer, sheet, cylinder, or spheres.

In an embodiment of this method using a fluidized bed reactor, the reactor may be designed to retain the catalyst while allowing the CNTs to be entrained in the gas flow and to be lofted out of the reaction zone upon reaching a desired size, said lofting being due to the drag forces on the forming particles. This control may be achieved through the shape of the reactor, the gas flow rates, or shape and flow rates in combination, and may allow control over the residence time of the elutriates and the corresponding size of the solid carbon product (such as the length of the carbon nanotubes).

The catalytic converters may be designed as either batch or continuous reactors so that the solid carbon is deposited on at least one solid surface where the solid surface (upon which the carbon is deposited) is the desired object of manufacture or a component thereof and where the solid carbon product may include or be entirely composed of pyrolytic graphite, or one or more species of Buckminster fullerenes. The entire surface of the object of manufacture need not be coated with the carbon. The carbon deposition area on the solid surface optionally may be limited to one or more regions by masking, or by selectively depositing the catalyst or catalyst precursor to promote the formation of the solid carbon on portions of the solid surface.

The means for collecting and separating the solid carbon product from the gas stream or from solid surfaces on which they form will readily occur to the skilled practitioner and will involve known methods for separating solids from gas or liquid streams. Such methods for separating solid carbon products from the gas phase include, but are not limited to, elutriation, centrifugation, electrostatic precipitation, and filtration.

The separation of the solid product from the gas stream and the catalyst depends on the type of reactor used. For example, the solid carbon may be harvested directly from the gas stream in an aerosol reactor or the elutriates from a fluidized bed reactor, using electrophoretic or thermophoretic collectors or by various filtration methods. For a solid catalyst or solid surface mounted catalyst, the solid carbon product may be scrapped or otherwise abraded from the surface of the solid carrier material.

In some cases it may be beneficial to remove the product from the reaction gas mixture prior to cooling (for example, by withdrawing the solid carbon from the reactor through a purge chamber wherein the reaction gases are displaced by an inert purging gas such as helium). Purging prior to cooling helps reduce the deposit or growth of undesirable morphologies on the desired solid carbon product during the cooling process.

In aerosol or fluidized bed reactors, the residence time in the growth zone may be controlled by a number of forces (such as gravitational, electromagnetic, or centrifugal forces) counteracting the motion of the gas stream. These forces counterbalance the gas flow to help control the residence time, so that the size of the solid carbon product may be controlled.

In another embodiment, using an aerosol reaction, electrospraying is an effective way to introduce preformed catalysts, or a solution of catalyst precursor, into an aerosol reactor. The electrospray uses coulomb forces to separate the catalyst particle, or the catalyst precursor solution, into small droplets from which individual particles form. The electrospray helps keep the particles separated so that they do not tend to clump or fuse. The electrospray also tends to charge the resulting carbon particles and make them easier to harvest from the aerosol using electrostatic collectors.

In aerosol reactors the catalyst may be formed by spraying catalyst precursors or preformed catalysts into a carrier gas or fluid for transport into the reaction zone. The catalyst or catalyst precursors may be preconditioned in a catalyst conditioning process prior to mixing with the reaction gases. Catalyst conditioning by heating in an inert carrier gas may promote the growth of specific chiralities of single wall carbon nanotubes, for example, helium is known to promote the growth of chiralities with metallic properties. Also, one or more substances may be introduced into the reaction zone to modify the physical properties of the desired solid carbon product either through incorporation in the solid carbon product, or by surface deposition on the solid carbon product.

In many cases the catalyst particle is removed from the surrounding matrix as the carbon nanotube grows so that the catalyst particle may be seen embedded in one of the ends of the nanotube. In scanning electron microscope images it appears that catalyst ends are significantly larger (e.g., 1.3 to 1.6 times the diameter) than the tubes that grow from them. This may be due to a carbon shell surrounding the catalyst, or it may be indicative of a fundamental relationship between the catalyst particle size and that of the carbon nanotube that grows from it, or it may be due to some other factor or even coincidence. In any case, one way to control the size of the carbon nanotubes appears to be through the control of the catalyzing particle size, with the catalyzing particle size being somewhat larger than the desired nanotube size.

In practice, the catalyst particle size may be controlled in a number of ways including as crystal domains in a metal substrate. For example, mild steel wool typically grows larger diameter carbon nanotubes than 316L stainless steel. By using preformed nanoparticles of the desired size, or by spraying droplets of catalyst precursor either onto a surface or into an aerosol from which the catalyst particle will crystallize (by adjusting the concentration of precursors and the size of the spray droplets, the size of the resulting particle may be controlled), the size of the carbon nanotubes may be adjusted.

The physical properties of the solid carbon materials may be substantially modified by the application of additional substances to the surface of the solid carbon. Many different modifications and functionalizations of the resulting solid carbon are known to the art and will readily occur to the skilled practitioner. The method of this invention contemplates adding modifying agents such as ammonia, thiophene, nitrogen gas, and surplus hydrogen to the reaction gases as those substances may result in desirable modifications to the physical properties of solid carbon, as documented in the literature. At least some of these modifications and functionalizations may be performed in the reaction zone.

Many of these modifying agents may be applied during the reaction. These substances may be introduced into the reduction reaction chamber near the completion of the solid carbon formation reaction by, for example, injecting a water stream containing the substance to be deposited such as a metal ion. The substances may also be introduced as a component of a carrier gas; for example, surplus hydrogen is known to result in the hydrogenation of the carbon lattice in some cases with the result of a significant yield of semiconductor species of the desired solid carbon product.

An advantage of this method is that it may be incorporated into power production, chemical processes, and manufacturing processes where the combustion of a primary hydrocarbon fuel source is the primary source of heat for the power or process. The resulting combustion gases contain the carbon oxides that may act as sources of carbon for the manufacture of the desired solid carbon product. The present method is scalable for many different production capacities so that, for example, plants designed with this method in mind may be sized to handle the carbon oxide emissions from the combustion processes of a large coal fired power plant or those from an internal combustion engine.

In another embodiment, the carbon oxides from a source gas mixture are separated from the source mixture and concentrated to form the carbon oxide feedstock for the reduction process. The carbon oxides in the source gases can be concentrated through many different means known to the art. In yet another embodiment, the catalytic conversion process may be employed as an intermediate step in a multi-stage power extraction process wherein the first stages cool the combustion gases to the reaction temperature of the reduction process for the formation of the desired solid carbon product. The cooled combustion gases, at the desired temperature of the reduction reaction, may then be passed through the reduction process and subsequently passed through additional power extraction stages.

Coupling this method with a hydrocarbon combustion process for electrical power production has the additional advantage that the hydrogen required for the reduction process may be formed by the electrolysis of water using off-peak power. The oxygen that is formed in the electrolysis process may be used as at least a portion of the combustible mixture for the combustion process.

When the methods disclosed are coupled with a combustion or chemical process that uses hydrocarbons, a portion of the hydrocarbons of the process may be used as the reducing agent gas. This may include the pyrolysis of the hydrocarbons to form a hydrogen gas that is provided as the reducing agent gas. Suitable means for adapting the process of this invention to the available hydrocarbon sources will readily occur to a skilled practitioner.

The reduction process of this method results in the formation of solid carbon product and water. The water may subsequently be condensed and the latent heat extracted for heating purposes, or as part of a low pressure power extraction cycle. Options for extracting the water as a useful co-product, and profitably using the associate latent heat will readily occur to the skilled practitioner.

EXAMPLES

Although the examples described herein have been used to describe the present method, it is understood that such detail is solely for this purpose, and variations may be made therein by those skilled in the art without departing from the spirit and scope of the method. The following Examples are included as illustrative of the methods of this invention.

| Example | Carbon Oxide | Reducing Agent | Catalyst | Conditions |
|---|---|---|---|---|
| Example 1 Multi-wall Carbon Nanotube Pillows | $CO_2$ | Hydrogen | rust on mild steel | Pressure = 1 atm Temp = 680° C. Time = 1 hour |
| Example 2 Multi Wall Carbon Nanotubes | $CO_2$ | Hydrogen | 304 stainless steel | Pressure = 1 atm Temp = 680° C. Time = 1 hour |
| Example 3 Multi Wall Carbon Nanotubes | $CO_2$ | Hydrogen | 316L stainless steel | Pressure = 1 atm Temp = 680° C. Time = 1 hour |
| Example 4 Multi Wall Carbon Nanotubes | $CO_2$ | Hydrogen | Steel Wool | Pressure = 1 atm Temp = 700° C. Time = 1 hour |
| Example 5 Graphite platelets | $CO_2$ | Hydrogen | 304 steel | Pressure = 1 atm Temp = 575° C. Time = 1 hour |
| Example 6 Carbon Nanotube Pillows | $CO_2$ | Hydrogen | 304 steel | Pressure = 1 atm Temp = 650° C. Time = 1 hour |

Each example is explained in additional detail in the following subsection, and scanning electron microscope images of the products of each of the examples are included.

The laboratory setup used for all of the examples is illustrated in FIG. 1. The experimental apparatus includes two tube furnaces 1 and 2 with quartz tubes, connected in series. This arrangement was created to enable the concurrent running of separate tests in each of the furnaces, potentially at different reaction temperatures and with different catalysts, but with the same reaction gas mixture and pressure. This arrangement allowed for more rapid testing when both furnaces were run. However, only a single furnace is required for effective operation: the two-furnace arrangement shown was used for experimental convenience. The samples were placed inside either of the tube furnaces. All tests were run in a batch mode. The furnaces took approximately 1 to 2 hours to come up to temperature and 4 to 6 hours to cool so that the samples could be removed. Often, the experiment was run with only one of the furnaces. All of the components illustrated in FIG. 1 together with associated piping, instrumentation, and appurtenances are collectively referred to as the "experimental apparatus" in the following description of the experimental examples.

The gases used in various combinations in the examples were:
  Carbon Dioxide ($CO_2$), research grade, PraxAir
  Methane ($CH_4$), research grade, PraxAir
  Nitrogen ($N_2$), standard grade, PraxAir
  Helium (He), research grade, Air Liquide
  Hydrogen ($H_2$), research grade, PraxAir As depicted in FIG. 1, the gases were piped from a gas supply 6 to mixing valve 7 where they were metered and distributed to tube furnaces 1 and 2. The gases flowed through the tube furnaces 1 and 2, to a refrigerated condenser 4 (dew point 38° F.), then through a compressor 3 and back into the head end of the tube furnace 1. A vacuum pump 5 was used to evacuate the experimental apparatus if a particular experiment required purging the furnaces with inert gases.

The temperature of the first furnace 1 was measured by a type K thermocouple located inside the tube at approximately the centerline of the first furnace 1. The temperature of the second furnace 2 was measured by a type K thermocouple located at approximately the centerline of the second furnace 2 in a well drilled in the ceramic insulation of the furnace. The temperatures reported are the gauge temperatures as shown on these thermocouples, and while indicative of the temperature in the reaction zone, are not exceptionally accurate. Every particular experimental setup will have similar limitations in reporting accurately the reaction temperature in various regions of the reaction zone. However, the results reported are for the gauge temperature reported, and appropriate experiment and variation of the temperature in this vicinity in the specific equipment of a skilled practitioner should yield similar results in similar apparatus.

No attempt was made to measure or to control the recirculation flow rate, and the quality of the product and speed of reaction seemed to be independent of whether the high volume compressor or the low volume pump were used. This may have been because in all cases the flow rate was above a critical threshold. Flow rates are important in the optimal design and operation of production facilities, but are not particularly important in the tests reported here because the volume of the experimental apparatus was much larger than the volume of the catalyst and resulting solid carbon product. Appropriate tests to determine the optimum flow rates for a specific production design will readily occur to a skilled practitioner.

During the experiments, the pressure of the gases in the experimental apparatus would suddenly begin to rapidly drop as the temperature increased. The temperature at which the pressure began to drop varied with the catalyst and gas mixture. This drop in pressure may be an indication of the onset of formation of the solid carbon product. The pressure was then maintained by adding additional reaction gases to the experimental apparatus. After a short time, the pressure would begin to rise, at which point the addition of reaction gases was terminated. The pressure drop and the duration of the pressure drop appear to be a proxy for the onset of CNT growth and the duration and rate of growth.

The start-up procedure followed one of two methods: heating in inert gas (helium or nitrogen), or heating in air. In the case of heating in inert gas, the experimental apparatus was evacuated and purged for approximately 5 minutes, after which the vacuum pump 5 was turned off and the experimental apparatus was brought to atmospheric pressure with the inert gas. The inert gas was then turned off and the furnaces were turned on to begin their heating cycle. In the case of air, the furnaces were not purged at start-up. The furnaces were simply turned on and brought to temperature.

When the furnaces reached approximately the experimental set point temperature, the experimental apparatus was evacuated and purged with reaction gas mixture (typically a stoichiometric mixture of carbon dioxide and reducing gas) for five minutes. The experimental apparatus was then brought to atmospheric pressure while the reaction gases and the temperature continued to rise until the experimental apparatus gauge temperature was at the selected test temperature.

In the examples, the furnaces were operated for a fixed time (typically 1 hour), at which time the furnaces were turned off, purged and allowed to cool. After the furnaces were turned off, the vacuum pump 5 was turned on, the reaction gases evacuated and the experimental apparatus purged with an inert gas (either helium or nitrogen) for approximately 5 minutes, then the vacuum pump 5 was turned off and the experimental apparatus was brought up to atmospheric pressure with an inert purge gas and allowed to cool.

During the experiments, there were no observed differences in the quality of the product CNTs based on the inert gas used for purging and cooling. Additional testing may show that the properties of the CNTs are modified by the cooling gas mixture and rate of cooling. Implementations of continuous flow reactors based on the Examples reported here will readily occur to the skilled practitioner.

Example 1

| Example | Carbon Oxide | Reducing Agent | Catalyst | Conditions |
|---|---|---|---|---|
| Example 1 Multi-wall CNTs on solid substrate | $CO_2$ | Hydrogen | rust on mild steel | P = 1 atm Temp = 680° C. Time = 1 hour |

For Example 1, a sample of mild steel wafer with extensive red rust spots was used as the catalyst. The mild steel wafer was placed in furnace 1 at approximately the center line. The vacuum pump 5 was started and helium was used to purge the experimental apparatus for five minutes. After five minutes the vacuum pump 5 was turned off, the compressor 3 was turned on, the refrigerated condenser 4 was turned on and the helium gas continued to flow until the pressure was 680 torr. at which point the gas flow was shut off. The furnace 1 was then turned on.

When the furnace 1 temperature reached the set point temperature of 680° C., the vacuum pump 5 was turned on and reaction gases in a stoichiometric mixture of carbon dioxide and hydrogen, from gas supply 6 controlled by mixing valve 7, were used to purge the experimental apparatus for five minutes. After five minutes the vacuum pump 5 was turned off. When the experimental apparatus reached a pressure of 760 torr. the reaction gases were shut off. Additional reaction gases were added periodically to keep the experimental apparatus gauge pressure between 640 torr. and 760 torr. The test ran for 1 hour after which the furnace 1 was shut off, the vacuum pump 5 was started and the experimental apparatus was purged with helium, from gas supply 6 controlled by mixing valve 7, for 5 minutes. The vacuum pump 5 was then shut off and the helium purge gas continued to flow until the gauge pressure in the experimental apparatus was 740 torr. The furnace 1 was then left to cool.

Figure 2:
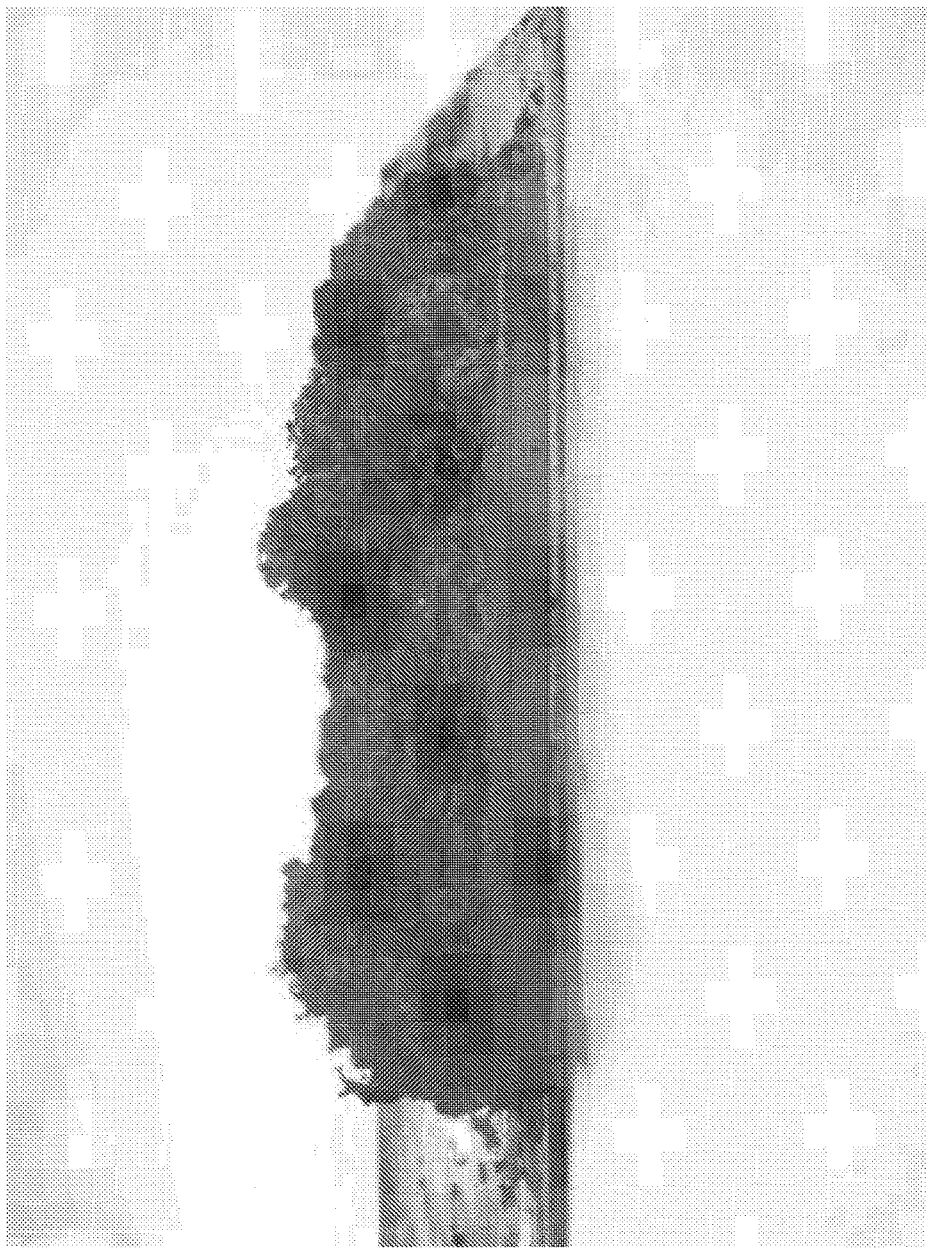
FIG. 2 depicts a side view of carbon nanotube ("CNT") "forest" growth of "pillow" morphology on a substrate produced as a result of experimental Example 1 conducted according to one embodiment of the present method.
Figure 4:
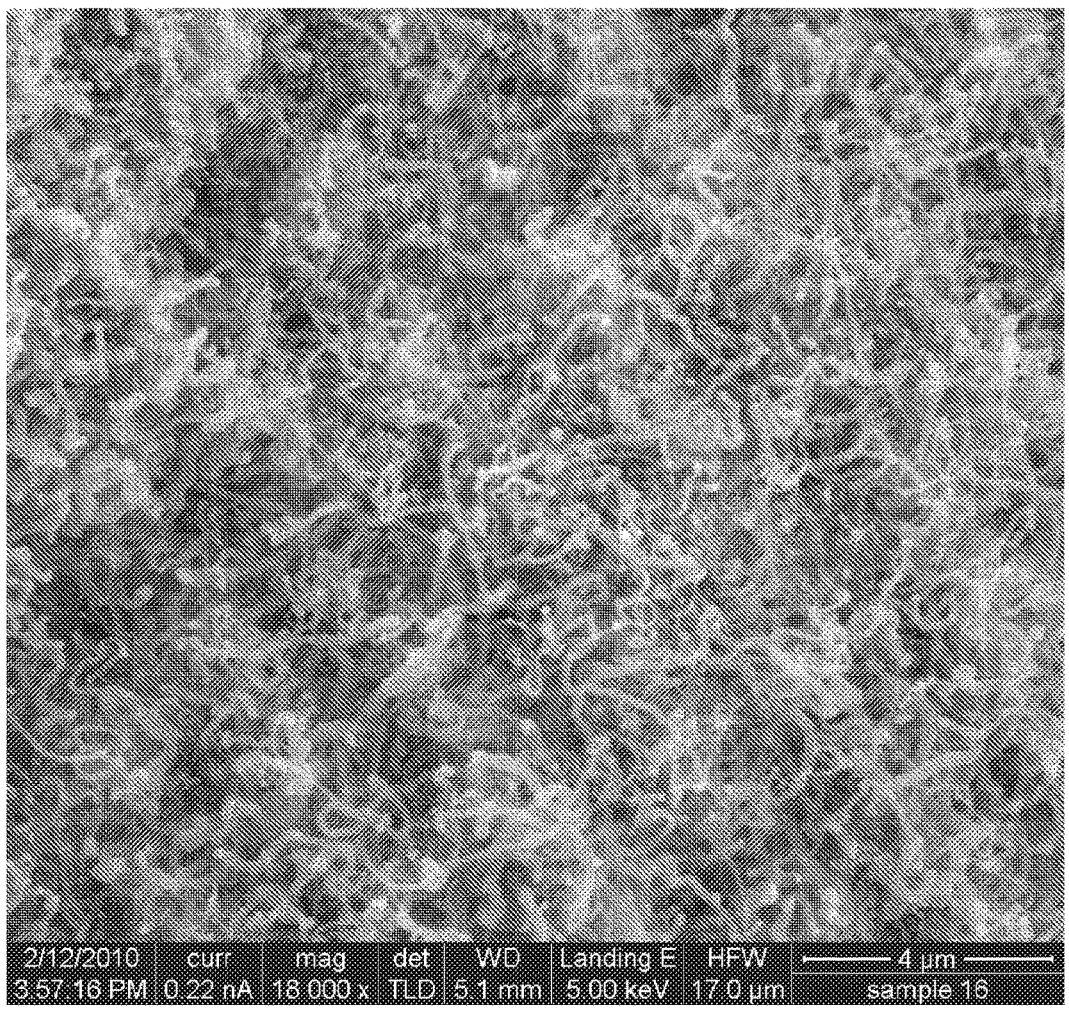
FIG. 4 depicts CNTs comprising pillows in the forest depicted in FIG. 3 at 18,000× magnification.
Figure 5:
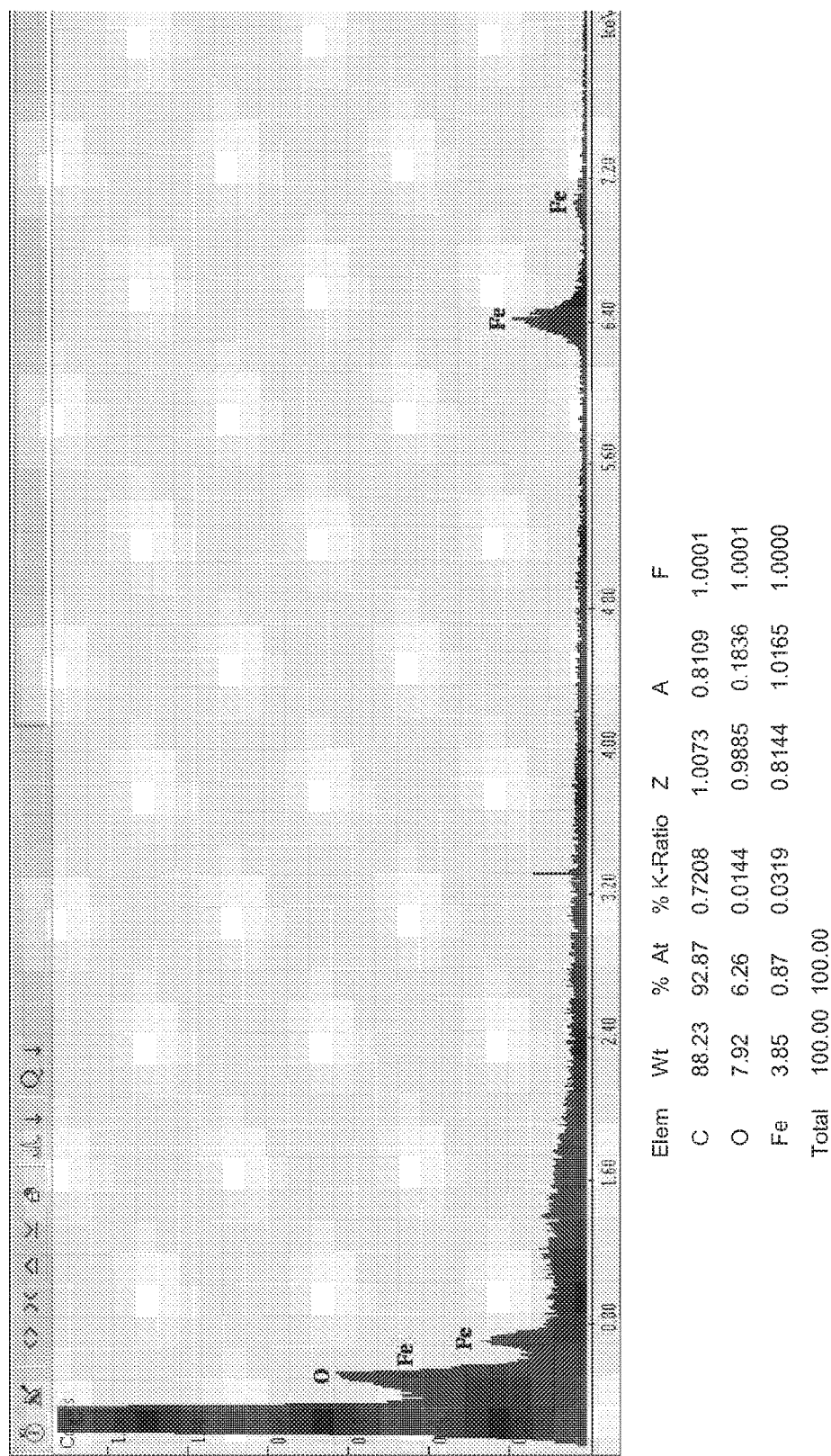
FIG. 5 depicts a graph of elemental analysis of typical pillow CNTs from forest growth.

The steel sample was removed after the furnace 1 had cooled. FIG. 2 shows a photograph of the sample after it was removed; notice the "forest" type of growth on the substrate. This forest is comprised of carbon nanotube "pillows." FIG. 3 shows a SEM image of the same sample under 700× magnification. FIG. 4 shows the same sample under 18,000× magnification and shows the details of a typical "pillow." The size of the CNTs (tens to hundreds of nanometers in diameter) indicates that they are most probably multi-wall CNTs. Note that in FIG. 4 the catalyst in the growth tip end of each carbon nanotube may be seen. The average diameter of the growth tip appears to be approximately 1.2 to 1.3 times the diameter of the associated carbon nanotube. FIG. 5 shows the elemental analysis of the CNTs in FIG. 4, indicating the CNTs are carbon with minor iron and oxygen constituents, perhaps due to the catalyst particles embedded in the growth tip of the CNTs.

Example 2

| Example | Carbon Oxide | Reducing Agent | Catalyst | Conditions |
|---|---|---|---|---|
| Example 2 Multi Wall Carbon Nanotubes | $CO_2$ | Hydrogen | 304 stainless steel and quartz disk | P = 1 atm Temp = 680° C. Time = 1 hour |

For Example 2, a sample quartz disk was placed lying flat on a 304 stainless steel wafer, which was used as the catalyst. The 304 stainless steel catalyst wafer was placed in furnace 1 at approximately the center line. The vacuum pump 5 was started and helium was used to purge the experimental apparatus for five minutes. After five minutes the vacuum pump 5 was turned off, the compressor 3 was turned on, the refrigerated condenser 4 was turned on and the helium gas continued to flow until the pressure was 680 torr. at which point the gas flow was shut off. The furnace 1 was then turned on.

When the furnace 1 temperature reached the set point temperature of 680° C., the vacuum pump 5 was turned on and reaction gases in a stoichiometric mixture of carbon dioxide and hydrogen, from gas supply 6 controlled by mixing valve 7, were used to purge the experimental apparatus for five minutes. After five minutes the vacuum pump 5 was turned off. When the experimental apparatus reached a gauge pressure of 760 torr. the reaction gases were shut off. Additional reaction gases were added periodically to keep the experimental apparatus pressure between 640 torr. and 760 torr. The test ran for 1 hour after which the furnace 1 was shut off, the vacuum pump 5 was started and the experimental apparatus was purged with helium, from gas supply 6 controlled by mixing valve 7, for 5 minutes. The vacuum pump 5 was then shut off and the helium purge gas continued to flow until the gauge pressure in the experimental apparatus was 740 torr. The furnace 1 was then left to cool.

Figure 6:
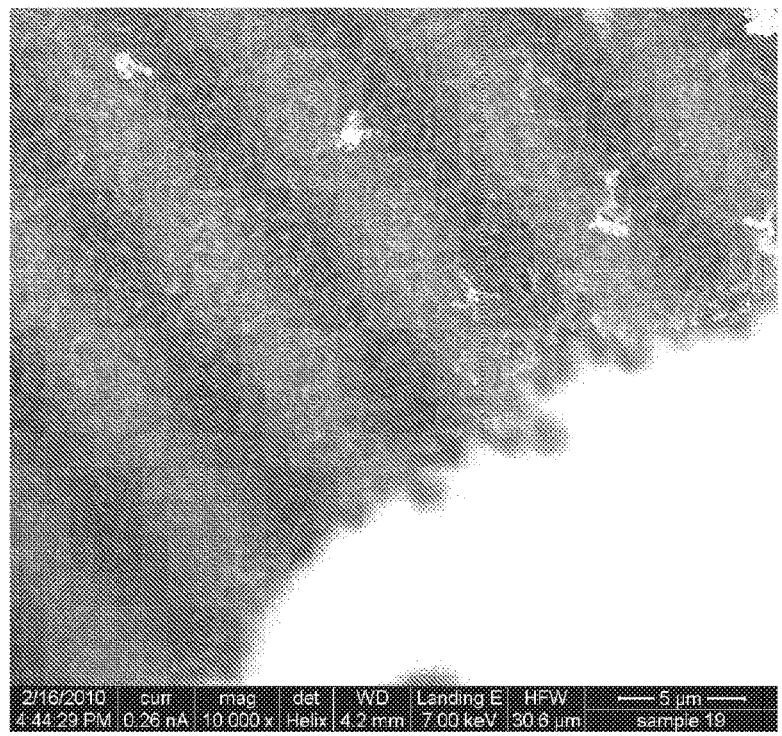
FIG. 6 depicts a sample of CNTs produced as a result of experimental Example 2 under 10,000× magnification.
Figure 7:
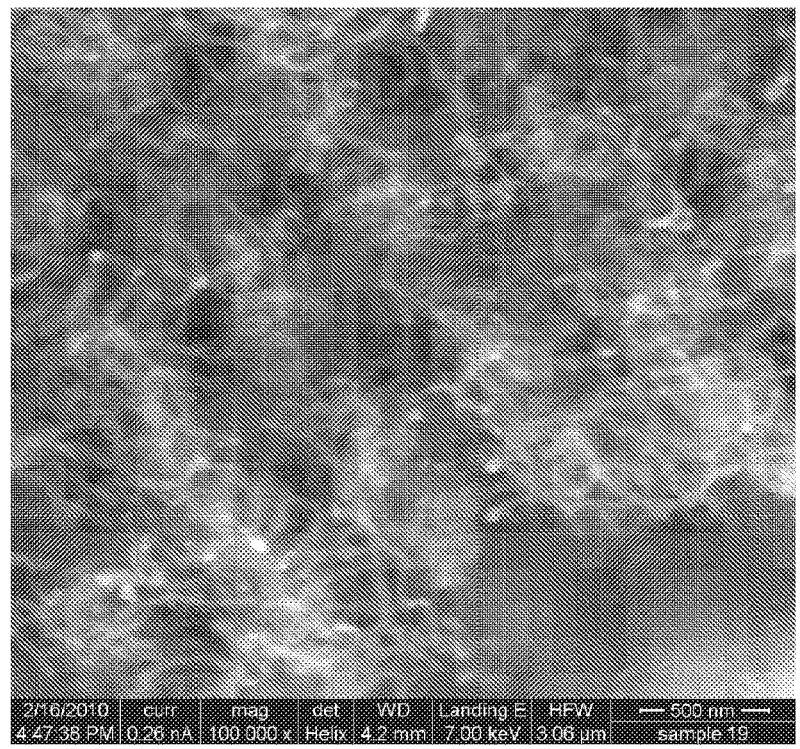
FIG. 7 depicts the sample depicted in FIG. 6 under 100,000× magnification.

The steel sample was removed from the furnace 1 after the furnace 1 had cooled. A mat of CNTs grew between the quartz and the wafer. Portions of the CNT mat adhered to both the quartz and the steel catalyst wafer surfaces. FIG. 6 shows the sample under 10,000× magnification, and FIG. 7 shows the sample under 100,000× magnification. The size of the CNTs (tens to hundreds of nanometers in diameter) indicates that they are probably multi-wall CNTs.

Example 3

| Example | Carbon Oxide | Reducing Agent | Catalyst | Conditions |
|---|---|---|---|---|
| Example 3 Multi Wall Carbon Nanotubes | $CO_2$ | Hydrogen | 316L stainless steel | Pressure = 1 atm Temp = 700° C. Time = 1 hour |

For Example 3, a 316L stainless steel wafer was used as the catalyst. The 316L stainless steel wafer was placed in furnace 1 at approximately the center line. The compressor 3 was turned on, the refrigerated condenser 4 was turned on, the vacuum pump 5 was turned on and a purge gas comprising helium, from gas supply 6 controlled by mixing valve 7, was introduced into the experimental apparatus. After 5 minutes of purging the vacuum pump 5 was shut off and the helium purge gas continued to flow until the gauge pressure of the experimental apparatus was 680 torr. at which point the purge gas flow was shut off. The furnace 1 was then turned on.

When the furnace 1 temperature reached 700° C., the vacuum pump 5 was started and reaction gases in a stoichiometric mixture of carbon dioxide and hydrogen, from the gas supply 6 controlled by mixing valve 7, passed into the experimental apparatus. After five minutes, the vacuum pump 5 was shut off and the reaction gases continued to flow until the gauge pressure of the experimental apparatus was 730 torr., at which point the reaction gas flow rate was reduced to a lower flow rate sufficient to keep the pressure between 700 torr. and 730 torr. The experimental apparatus ran for 1 hour after which the furnace 1 was shut off, the vacuum pump 5 was started and the experimental apparatus was purged with helium from the gas supply 6, controlled by mixing valve 7, for 5 minutes. The vacuum pump 5 was then shut off and the helium purge gas continued to flow until the gauge pressure in the experimental apparatus was 760 torr. The furnace 1 was then left to cool.

Figure 8:
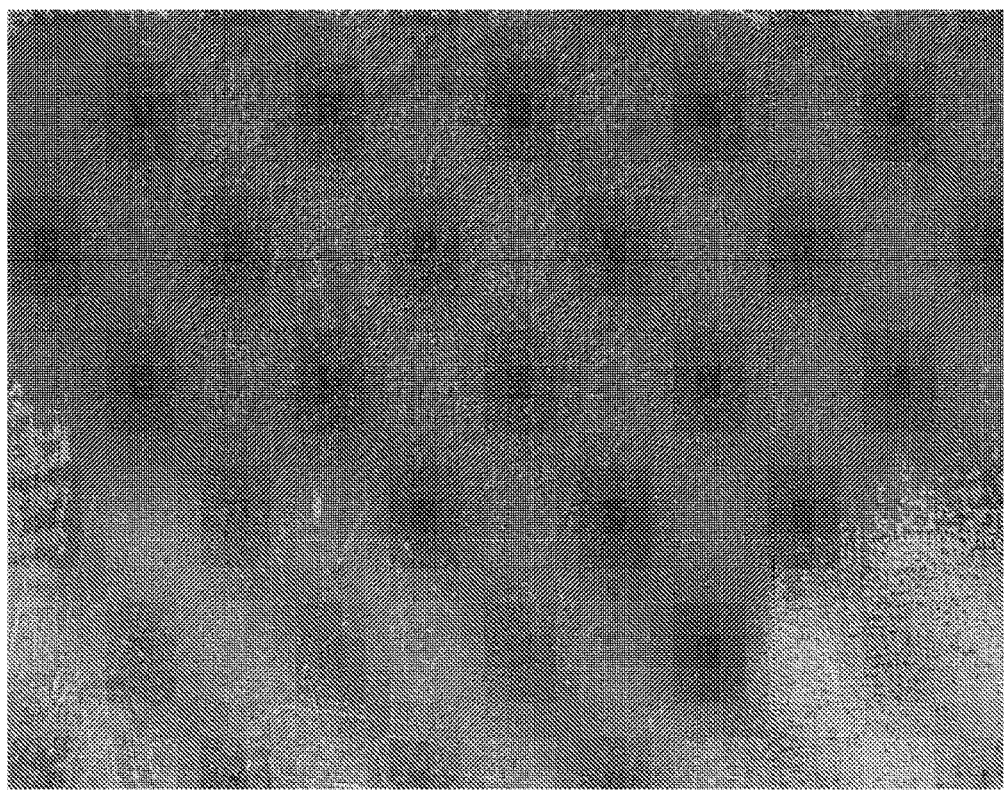
FIG. 8 depicts a photograph of a 316L stainless steel wafer with CNT forest growth, taken after conducting the experiment described in experimental Example 3.
Figure 9:
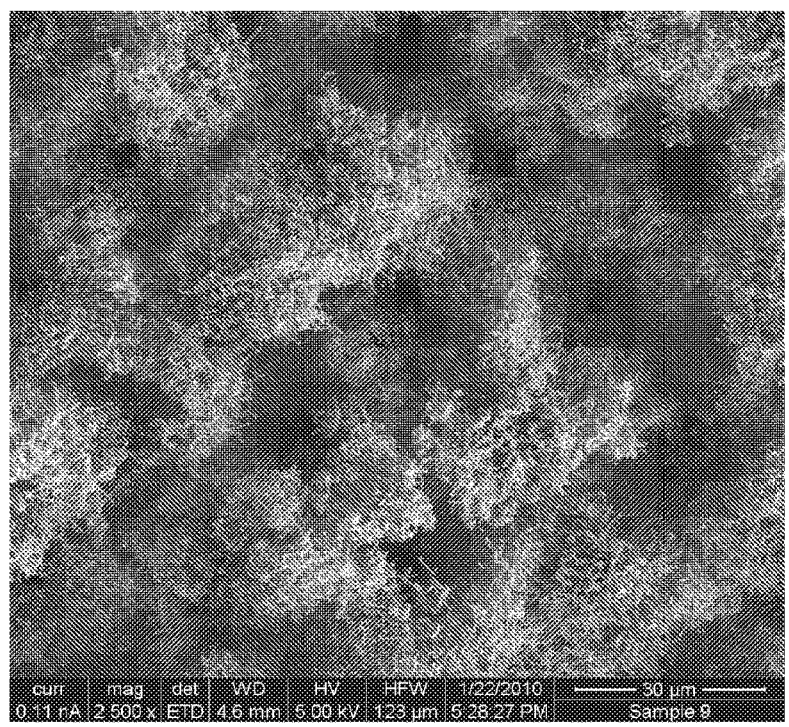
FIG. 9 depicts an image of a region of the CNT forest growth from Example 3 at 2,500× magnification.
Figure 10:
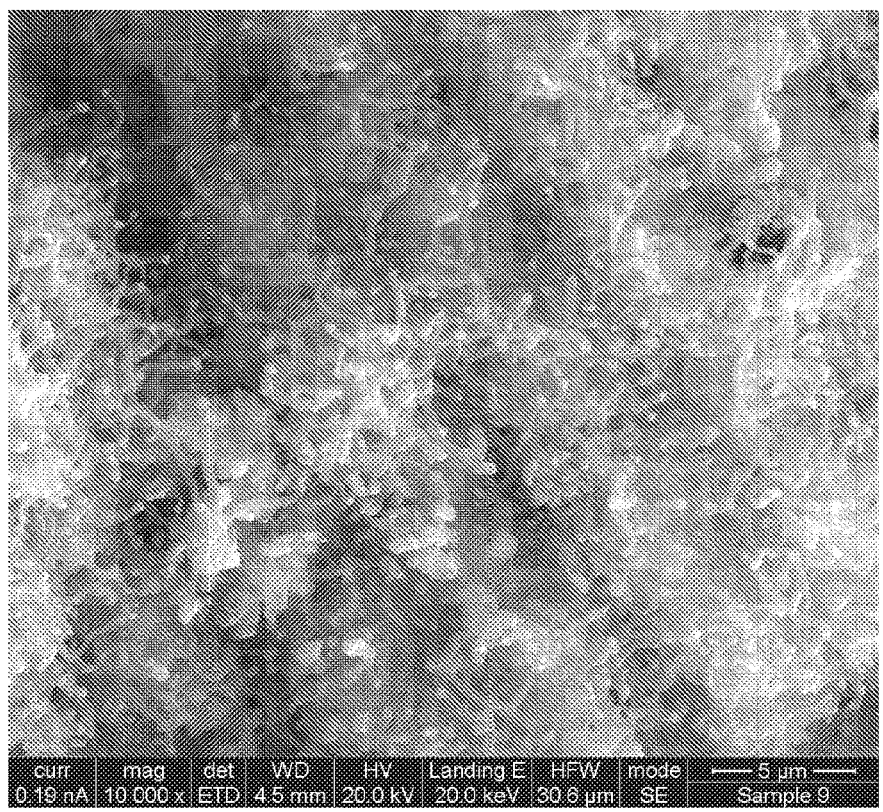
FIG. 10 depicts an image of the CNT forest growth from Example 3 at 10,000× magnification.

The steel sample was removed from the furnace 1 after the furnace had cooled. The 316L stainless steel wafer was removed from furnace 1 after the furnace had cooled. FIG. 8 is a photograph of the 316L stainless steel wafer. Note that solid carbon product, carbon nanotubes, grew on only a portion of the wafer. The reasons for this are unclear. FIG. 9 shows an image of a region of the CNT forest on the wafer at 2,500× magnification and FIG. 10 shows an image of the same region of the CNT forest at 10,000× magnification. The diameter of the tubes indicates that the CNTs are most likely multi-wall.

Example 4

| Example | Carbon Oxide | Reducing Agent | Catalyst | Conditions |
|---|---|---|---|---|
| Example 4 Multi Wall Carbon Nanotubes | $CO_2$ | Hydrogen | steel wool | Pressure = 1 atm Temp = 700° C. Time = 1 hour |

For Example 4, a sample of mild steel wool was used as the catalyst. The mild steel wool sample was placed in the furnace 1 near the center line and heated in air. The furnace 1 was turned on, the compressor 3 was turned on and the refrigerated condenser 4 was turned on. When the furnace 1 temperature was 645° C. (that is, before the furnace 1 had come to the set point temperature of 700° C.) the vacuum pump 5 was started and a stoichiometric mixture of carbon dioxide and hydrogen, from the gas supply 6, controlled by mixing valve 7, flowed into the experimental apparatus for five minutes. At the end of five minutes the vacuum pump 5 was shut off and the gases continued to flow until the gauge pressure of the experimental apparatus was 530 torr. at which point the reaction gas flow rate was reduced to a lower flow rate sufficient to keep the pressure between 500 torr. and 530 torr. The experimental apparatus ran for 1 hour after which the furnace 1 was shut off, the vacuum pump 5 was started and the experimental apparatus was purged with helium from the gas supply 6, controlled by mixing valve 7 for 5 minutes. The vacuum pump 5 was then shut off and the helium purge gas continued to flow until the gauge pressure in the experimental apparatus was 700 torr. The furnace 1 was then left to cool.

Figure 11:
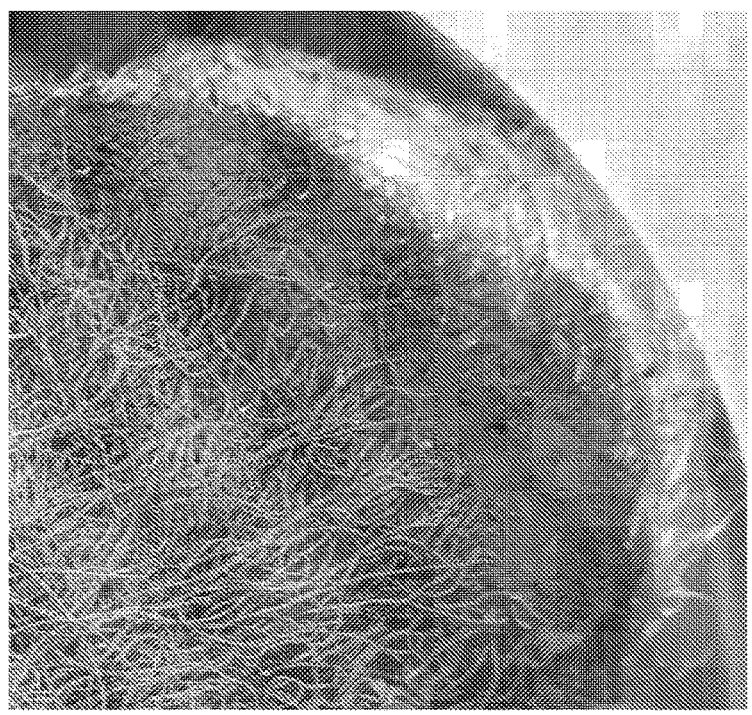
FIG. 11 depicts a photograph of a steel wool sample from experimental Example 4.
Figure 12:
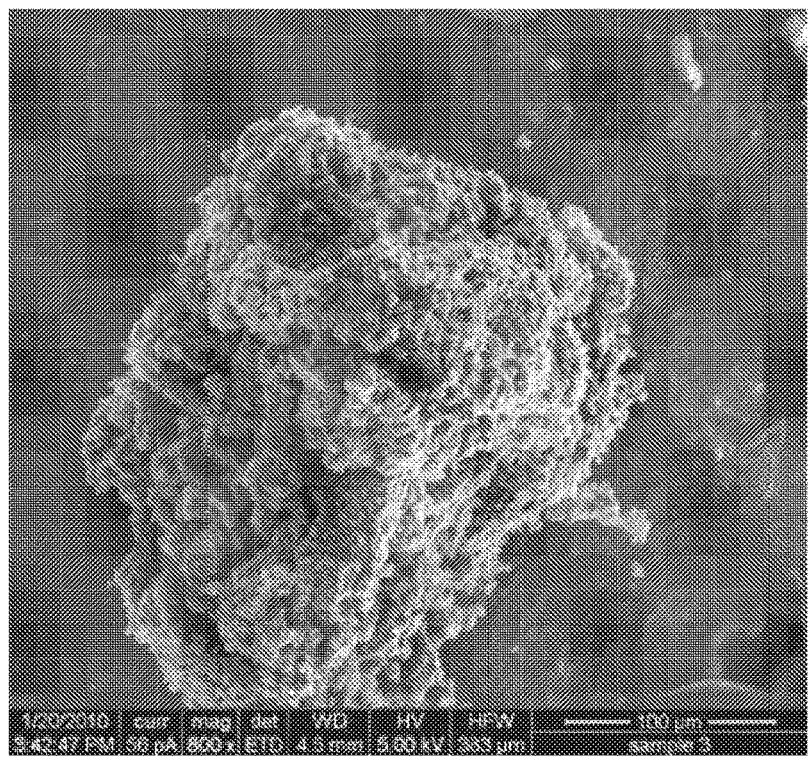
FIG. 12 depicts an image of a particle of the powder from Example 4 at 800× magnification.
Figure 13:
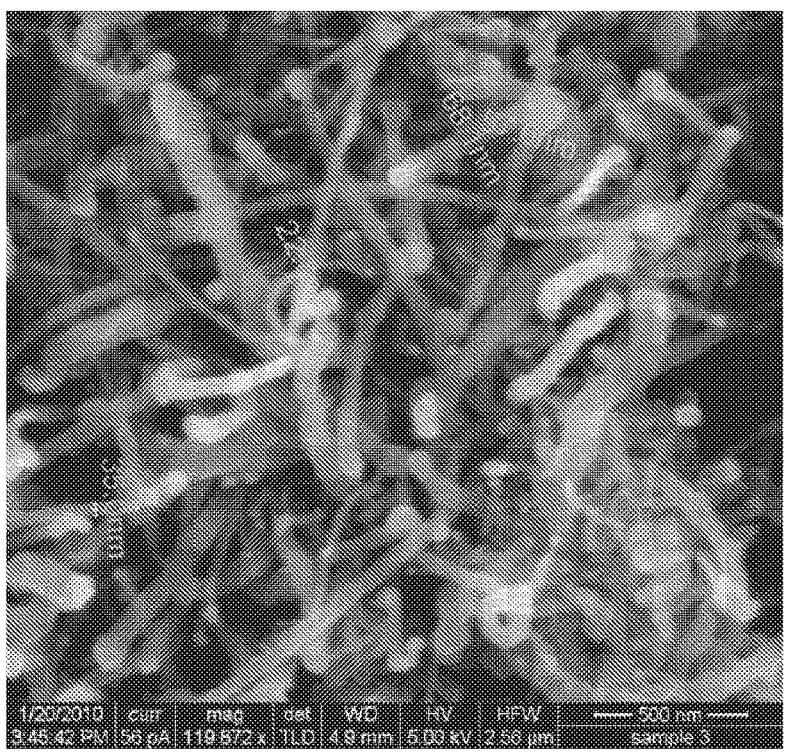
FIG. 13 depicts an image of a particle of the powder from Example 4 at 120,000× magnification.

The steel wool sample with the solid carbon product was removed after the furnace 1 had cooled. FIG. 11 is a photograph of the steel wool sample. Note the powdery black band of solid carbon product, which was sampled and examined under SEM resulting in FIG. 12 showing an image of a particle of the powder at 800× magnification. The particle is a single "pillow" of the pile of pillows comprising the powdery black band. FIG. 13 shows an image of the same "pillow" at 120,000× magnification. The diameter indicates that the CNTs are likely multi-wall.

Example 5

| Example | Carbon Oxide | Reducing Agent | Catalyst | Conditions |
|---|---|---|---|---|
| Example 5 Graphite platelets | $CO_2$ | Hydrogen | 304 steel wire | Pressure = 1 atm Temp = 575° C. Time = 2 hour |

For Example 5, a sample of 316 stainless steel wire was used as the catalyst. The 316 stainless steel wire was placed in the furnace 1 near the exit of the furnace. The furnace 1 was turned on and the refrigerated condenser 4 was turned on. The vacuum pump 5 was started and reaction gases comprising a stoichiometric mixture of carbon dioxide and hydrogen from the gas supply 6 and controlled by the mixing valve 7 was used to purge the experimental apparatus for five minutes. After five minutes the vacuum pump 5 was turned off, the compressor 3 was turned on, and the reaction gas mixture continued to flow until the gauge pressure of the experimental apparatus was 589 torr. at which point the reaction gas flow was shut off. The experimental apparatus ran for 2 hours after which the furnace 1 was shut off, the vacuum pump 5 was started and the experimental apparatus was purged with helium from the gas supply 6, controlled by mixing valve 7, for 5 minutes. The vacuum pump 5 was then shut off and the helium continued to flow until the gauge pressure in the experimental apparatus was 700 torr. The furnace 1 was then left to cool.

Figure 14:
FIG. 14 depicts a photograph of the stainless steel wire sample from experimental Example 5 with a surface growth of graphite platelets.
Figure 15:
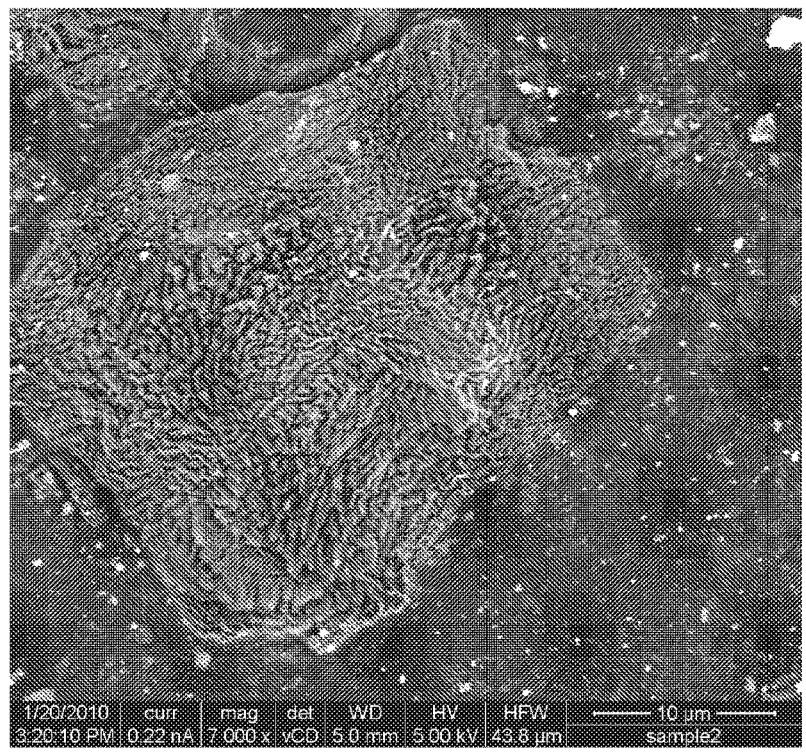
FIG. 15 depicts an image of a graphite platelet from Example 5 at 7,000× magnification.
Figure 16:
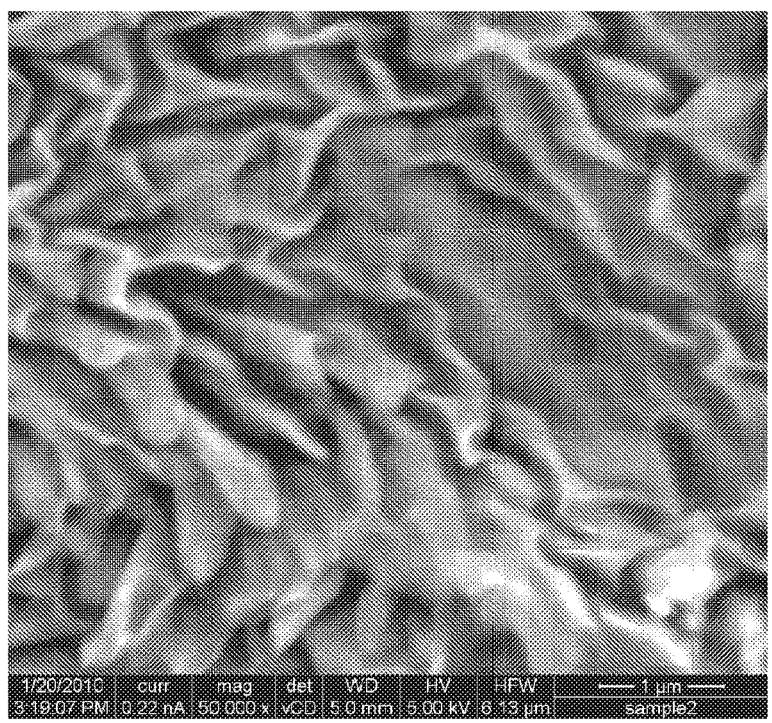
FIG. 16 depicts an image of a graphite platelet from Example 5 at 50,000× magnification.

The steel wire was removed from the furnace 1 after the furnace 1 had cooled. FIG. 14 is a photograph of the steel wire sample with the surface growth of the solid carbon product, in this example graphite platelets. Samples of the graphite platelets were imaged using SEM resulting in FIG. 15 showing an image of a graphite platelet at 7,000× magnification and FIG. 16 showing an image the detail of a graphite platelet at 50,000× magnification.

Example 6

| Example | Carbon Oxide | Reducing Agent | Catalyst | Conditions |
|---|---|---|---|---|
| Example 6 Carbon Nanotube Pillows | $CO_2$ | Hydrogen | 304 steel | Pressure = 1 atm Temp = 650° C. Time = 1 hour |

For Example 6, a 304 stainless steel wafer was used as the catalyst. Sample discs of quartz were place on the upper surface of the steel wafer. The 304 stainless steel wafer with the sample quartz discs was placed in furnace 1 at approximately the center line. The vacuum pump 5 was started and helium from the gas supply 6, controlled by mixing valve 7, was used to purge the experimental apparatus for five minutes. After five minutes the vacuum pump 5 was turned off, the compressor 3 was turned on, the refrigerated condenser 4 was turned on and the helium gas continued to flow until the experimental apparatus pressure was 680 torr., at which point the gas flow was shut off. The furnace 1 was then turned on.

When the furnace 1 temperature reached the set point temperature of 650° C., the vacuum pump 5 was turned on and reaction gases in a stoichiometric mixture of carbon dioxide and hydrogen, from the gas supply 6 controlled by the mixing valve 7, were used to purge the experimental apparatus for five minutes. After five minutes the vacuum pump 5 was turned off. When the experimental apparatus reached a gauge pressure of 760 torr., the reaction gases were shut off. Additional reaction gases were added periodically to keep the experimental apparatus pressure between 640 torr. and 760 torr. The test ran for 1 hour after which the furnace 1 was shut off, the vacuum pump 5 was started and the experimental apparatus was purged with helium, from the gas supply 6 controlled by the mixing valve 7, for 5 minutes. The vacuum pump 5 was then shut off and the helium purge gas continued to flow until the gauge pressure in the experimental apparatus was 740 torr. The furnace 1 was then left to cool.

Figure 17:
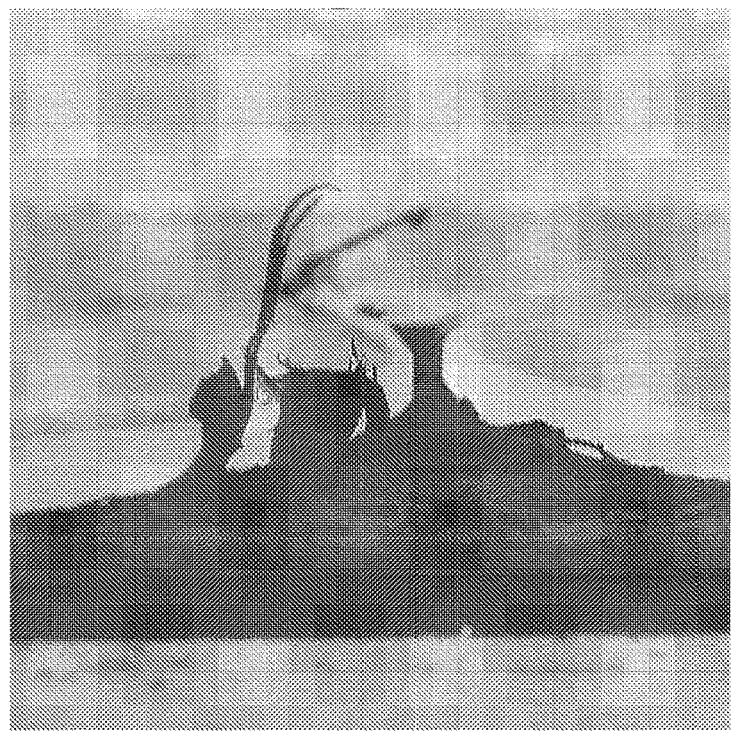
FIG. 17 depicts a photograph of the stainless steel wafer sample from experimental Example 6 with a fibrous growth of carbon nanotube "pillows;"
Figure 19:
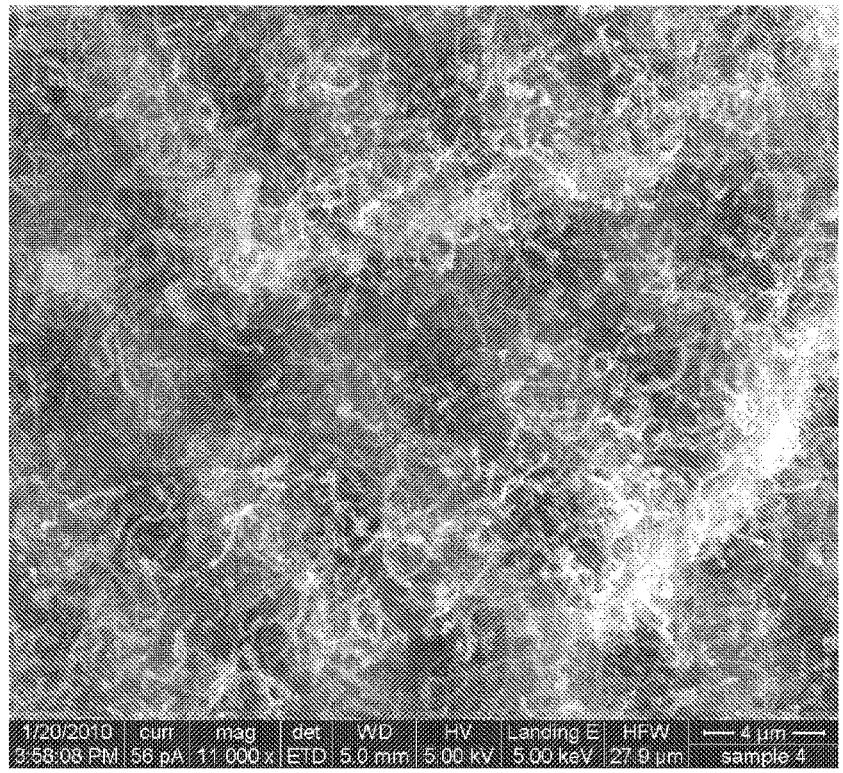
FIG. 19 depicts an image of a "pillow" from Example 6 at 11,000× magnification.
Figure 20:
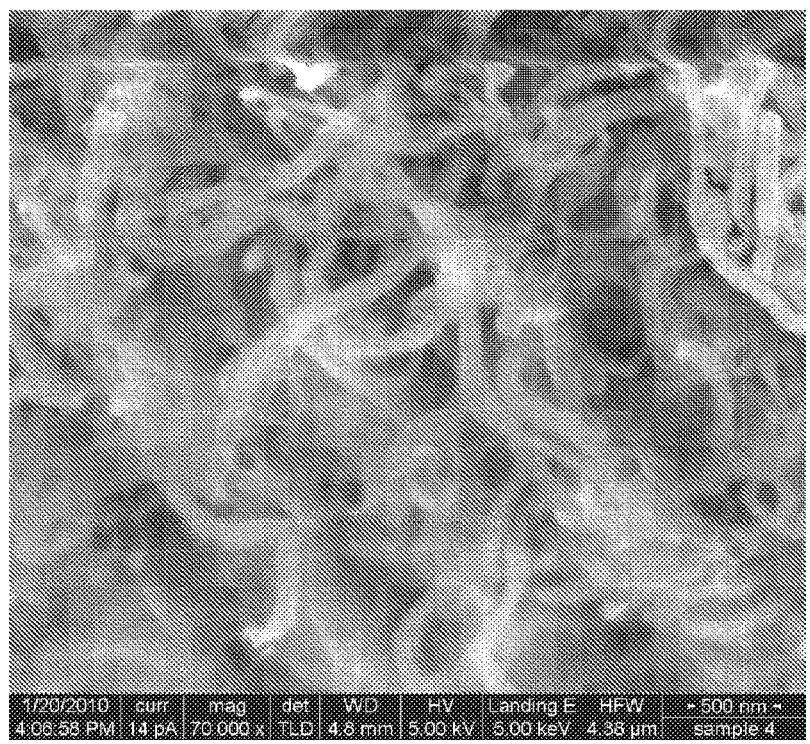
FIG. 20 depicts an image of a "pillow" from Example 6 at 70,000× magnification.
Figure 21:
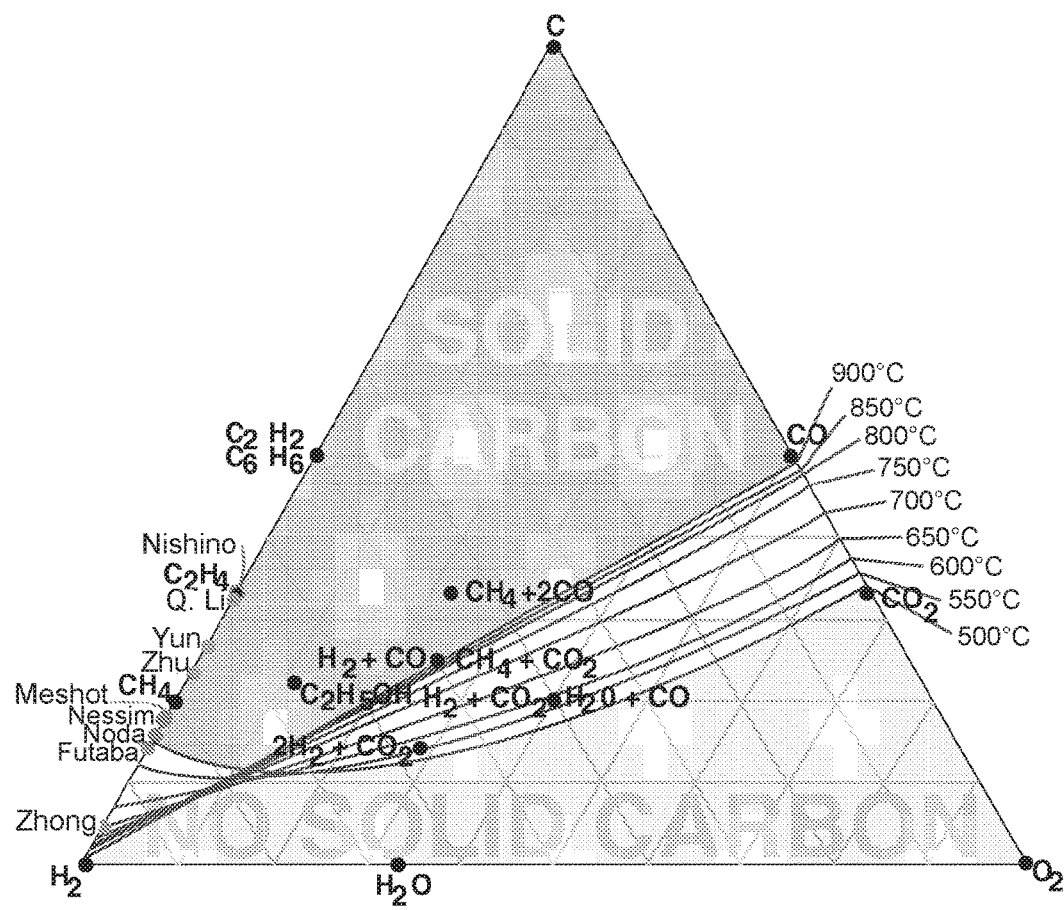
FIG. 21 depicts a C—H—O Equilibrium Diagram.

The steel sample was removed after the furnace 1 had cooled. FIG. 17 is a photograph of the sample with the surface growth of graphite platelets. Samples of the graphite platelets were imaged using SEM resulting in FIG. 18, showing an image of a graphite platelet at 778× magnification. FIG. 18 shows the pillows comprising the fibers. FIG. 19 shows an image of one of the pillows at 11000× magnification where the highly entangled structure of the carbon nanotubes may be seen. FIG. 20 shows a 70000× magnification showing the detail of some of the carbon nanotubes comprising the same pillow as is shown in FIG. 19.

Therefore, the present invention has several advantages over the prior methods. Although embodiments of the present methods have been described, various modifications and changes may be made by those skilled in the art without departing from the spirit and scope of the invention.

What is claimed is:

1. A composition of matter comprising entangled agglomerations of fibrous carbon on an iron-containing catalyst; wherein the entangled agglomerations of fibrous carbon are clustered with a characteristic dimension of less than 1 millimeter; wherein the fibrous carbon is formed by reacting carbon dioxide with a gaseous reducing agent in the presence of an iron-containing catalyst, at least some fibers of the fibrous carbon comprising a particle of the iron-containing catalyst embedded at an end thereof, the catalyst particle located at the end of the fiber in which it is embedded and having a diameter between about 1.3 and about 1.6 times a diameter of the carbon fiber; wherein the fibrous carbon comprises greater than about 3 weight percent iron, wherein the agglomerations of fibrous carbon comprise buckysphere partially merged with a tube structure of the fibrous carbon.

2. The composition of claim 1, wherein the fibrous carbon exhibit a plurality of diameters and a plurality of lengths.

3. The composition of claim 1, wherein the bulbous or billowing conglomerations of fibrous carbon are easily felted.

4. The composition of claim 1, wherein the fibrous carbon comprises interlocked agglomerations dispersed in an ethanol solution.

5. The composition of claim 1, wherein the iron-containing catalyst comprises steel.

6. A composition of matter comprising agglomerations of particles of solid carbon on an iron-containing catalyst; wherein the solid carbon is selected from the group consisting of pyrolytic graphite, carbon black, amorphous carbon, and buckminster fullerenes; wherein the agglomerations of particles of solid carbon are clustered with a characteristic dimension of less than 1 millimeter; wherein the solid carbon is formed by reacting carbon dioxide with a gaseous reducing agent in the presence of an iron-containing catalyst, at least some of the particles of solid carbon bonded to a particle of the iron-containing catalyst, the particle of the iron-containing catalyst embedded in an end of the particle of solid carbon and having a dimension between about 1.3 and about 1.6 times a dimension of the particle of solid carbon, wherein the particles of solid carbon comprise Buckminster fullerene merged with a tube structure of the solid carbon.

7. The composition of claim 6, wherein the particles of solid carbon exhibit a plurality of diameters.

8. The composition of claim 6, wherein the agglomerations of particles of solid carbon comprise bulbous or billowing conglomerations of solid carbon.

9. The composition of claim 8, wherein the bulbous or billowing conglomerations of solid carbon are easily felted.

10. The composition of claim 6, further comprising an ethanol solution in which the agglomerations of particles of solid carbon are dispersed.

11. The composition of claim 6, wherein the particles of solid carbon comprise buckminster fullerenes.

12. The composition of claim 6, wherein the particles of solid carbon comprise pyrolytic graphite.

13. The composition of claim 6, wherein the particles of solid carbon comprise carbon black.

14. The composition of claim 6, wherein the particles of solid carbon comprise amorphous carbon.

15. The composition of claim 6, wherein the iron-containing catalyst comprises stainless steel.

16. The composition of claim 6, wherein the iron-containing catalyst comprises particles formed from decomposition of iron oxide.

17. The composition of claim 6, wherein the iron-containing catalyst comprises a wire.

18. The composition of claim 6, wherein the iron-containing catalyst comprises steel wool.

* * * * *

UNITED STATES PATENT AND TRADEMARK OFFICE
CERTIFICATE OF CORRECTION

PATENT NO. : 10,500,582 B2
APPLICATION NO. : 15/357955
DATED : December 10, 2019
INVENTOR(S) : Dallas B. Noyes Page 1 of 1

It is certified that error appears in the above-identified patent and that said Letters Patent is hereby corrected as shown below:

In the Specification
        Column 8, Line 33, change "sub system/" to --subsystem/--

In the Claims
    Claim 3, Column 25, Lines 15-16, change "bulbous or billowing conglomerations" to --agglomerations--
    Claim 6, Column 25, Line 27, change "buckminster" to --Buckminster--
    Claim 11, Column 26, Line 18, change "buckminster" to --Buckminster--

Signed and Sealed this
Twenty-first Day of January, 2020

Andrei Iancu
*Director of the United States Patent and Trademark Office*